United States Patent [19]
Morioka et al.

[11] Patent Number: 5,848,034
[45] Date of Patent: Dec. 8, 1998

[54] DISK CHANGER APPARATUS

[75] Inventors: Yukio Morioka, Katano; Noriyosi Ohtaki, Yawata; Masahiko Nakamura, Yao, all of Japan

[73] Assignee: Matsushita Electric Industrial Co., Ltd., Osaka-fu, Japan

[21] Appl. No.: 707,877

[22] Filed: Sep. 9, 1996

[30] Foreign Application Priority Data

Sep. 12, 1995 [JP] Japan .................................. 7-234179

[51] Int. Cl.⁶ .......................... G11B 17/22; G11B 17/04
[52] U.S. Cl. .............................................. 369/36; 369/192
[58] Field of Search .................................. 369/36, 34, 38, 369/37, 178, 191, 75.1–75.2, 77.1–77.2; 360/98.04–98.06, 92, 99.02, 99.06

[56] References Cited

U.S. PATENT DOCUMENTS

| | | | |
|---|---|---|---|
| 4,527,262 | 7/1985 | Manto | 369/33 |
| 4,599,716 | 7/1986 | Shimbo | 369/36 |
| 4,633,452 | 12/1986 | Shimbo et al. | 369/39 |
| 5,550,801 | 8/1996 | Enomoto et al. | 369/36 |
| 5,615,202 | 3/1997 | Enomoto et al. | 369/36 |
| 5,754,519 | 5/1998 | Bando | 369/192 |
| 5,764,617 | 6/1998 | Furusawa et al. | 369/192 |

FOREIGN PATENT DOCUMENTS 6-34290  5/1994  Japan .

*Primary Examiner*—Allen T. Cao
*Attorney, Agent, or Firm*—Panitch Schwarze Jacobs & Nadel, P.C.

[57] ABSTRACT

A disk changer apparatus for playing back a plurality of disks selectively has a disk transfer unit including a forward feed lever 107 for taking out disks 2, 3 from under a stocker tray 1, and a rearward feed lever 110 for transferring the disks 2, 3 to a disk playback unit 102. A designated disk 2, 3 held in the stocker tray 1 is taken out from under the stocker tray 1 by the forward feed lever 107, and then the disk 2, 3 is transferred to the disk playback unit 102 by the rearward feed lever 110.

11 Claims, 28 Drawing Sheets

DISK CHANGER APPARATUS

FIELD OF THE INVENTION AND RELATED ART STATEMENT

1. Field of the Invention

The present invention relates to a disk changer apparatus for storing a plurality of disks and playing back selected ones of the stored disks sequentially or successively or specified music numbers selected in the disk.

2. Description of the Related Art

In recent years, various disk changer apparatuses have been developed in which a plurality of (especially, 10 or more) disks are stored and sequentially or selectively played back. With these types of apparatuses, the important requirement is how to supply to a disk playback unit and play back a designated disk accurately from a stocker tray storing the disks and return the disk to a predetermined stocker tray accurately after performance.

In order to meet this requirement, the gazette of the Japanese examined patent application hei 6-34290 (Tokko hei 6-34290), for example, discloses a disk changer apparatus for storing a multiplicity of disks and playing back them sequentially and selectively. This conventional disk changer apparatus comprises a disk push-up mechanism arranged under a stocker tray and a disk transport unit having a complicated mechanism with a rotatable roller arranged above the disks. In this disk changer apparatus, the disks stored substantially in upright positions in the stocker tray. A designated disk is lifted somewhat and brought into contact with the roller rotating above the disk in the disk transport unit. By the rotation of the roller and the movement of the disk transport unit itself the designated disk is supplied to a disk playback unit where the disk is played back.

The conventional disk changer apparatus described above is so configured that the disk transport unit having the rotatable roller is adapted to move between the stocker tray and the disk playback unit. For this reason, a very complicated structure is required of a disk transport mechanism and a guide mechanism. In addition, since the disk transport unit is arranged above the stored disks, the vertical dimension of the disk changer apparatus is undesirably large. To solve these problems and to realize a small disk changer apparatus of a simple construction have been demanded in this field.

OBJECT AND SUMMARY OF THE INVENTION

The object of the present invention, which has been developed for solving the above-mentioned problems, is to provide a small disk changer apparatus, in which a plurality of disks stored in a stocker tray can be sequentially and selectively supplied to a disk playback unit by a disk transport mechanism of a simple construction having a small number of parts and a designated disk can thus be played back in the disk playback unit with accuracy and stability.

In order to achieve the above-mentioned object, a disk changer apparatus of the present invention comprises a stocker tray for storing a plurality of disks of different diameters in juxtaposition, disk position search means for searching for the position of a disk designated among the disks stored in the stocker tray, transport means in which disk playback means for supporting and playing back a designated disk is driven to the position of the stocker tray holding the designated disk in parallel to the direction of juxtaposition of the disks stored in the stocker tray in response to a signal produced from the disk position search means, and disk transfer means including a first lever for taking out a designated disk from under the stocker tray and a second lever for guiding and transferring the designated disk from under the stocker tray to the disk playback means.

And, a disk changer apparatus of the present invention comprises a loading unit for supplying and replacing the disks stored in the stocker tray to the disk playback means, including a first lift lever as a first lever for taking up a disk from under the stocker tray and a second lift lever as a second lever for transporting the disk to the disk playback means.

For this reason, the disks stored in the stocker tray can be accurately supplied for replacement to the disk playback unit with a simple construction. Further, a mechanism for transporting the disks is not arranged above the disks stored in the stocker tray, and therefore a small disk changer apparatus with a small number of component parts is realized.

And further, in accordance with a disk changer apparatus of the present invention, in a disk playback mode that a disk to be played back is supplied to the disk playback means, the first lever of the disk transport means is arranged in a disk holding slot of the stocker tray for the disk to be played back. As a result, another disk is prevented from being mounted in the particular disk holding slot, so that all the other disks not being played back can be replaced without interrupting the playback operation of the particular disk.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

A disk changer apparatus in accordance with an embodiment of the present invention will be explained below with reference to the accompanying drawings.

Figure 1:
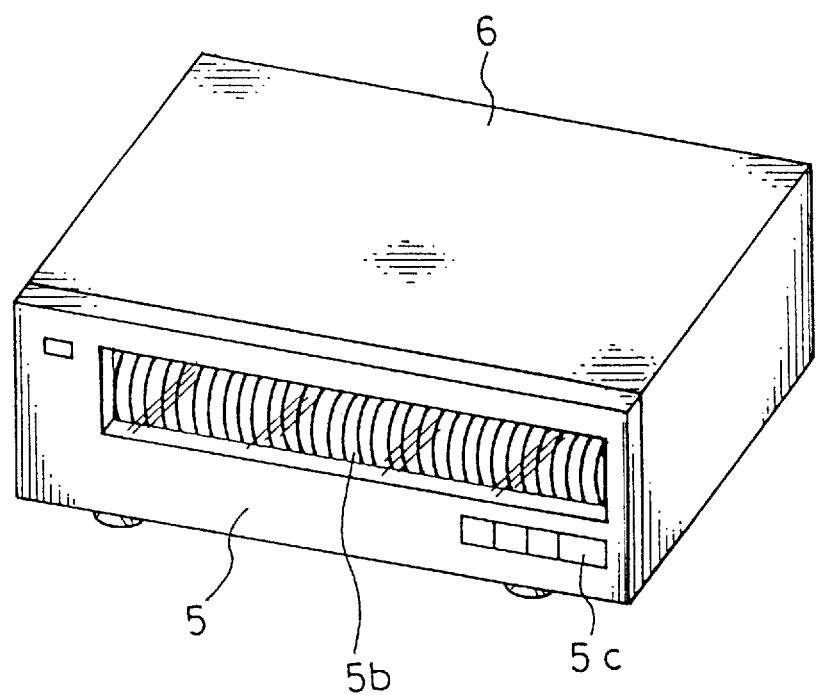
FIG. 1 is a perspective view showing an external appearance of a disk changer apparatus in accordance with an embodiment of the present invention.
Figure 2:
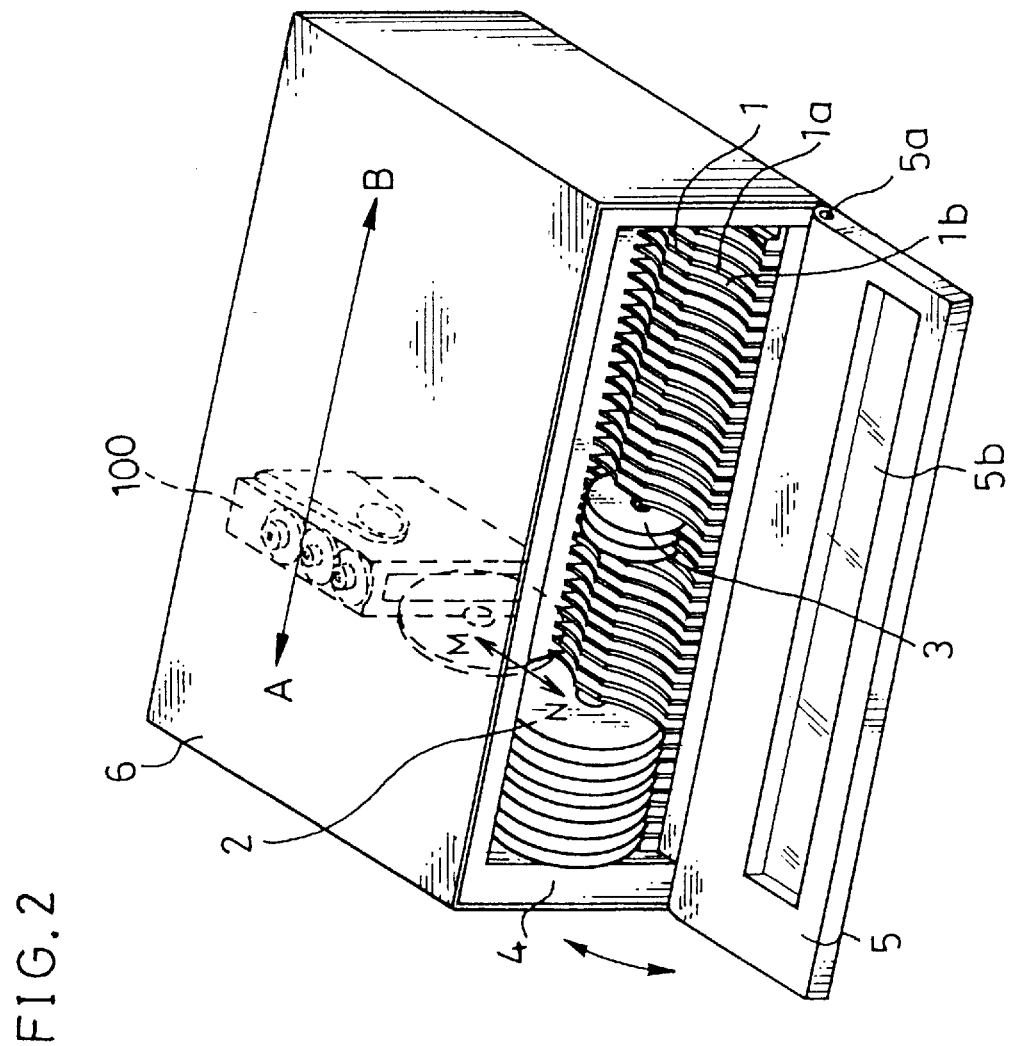
FIG. 2 is a perspective view of the disk changer apparatus of FIG. 1 with the front door thereof open.

FIG. 1 is a perspective view showing an external appearance of a disk changer apparatus in accordance with an embodiment of the present invention. FIG. 2 is a perspective view showing the disk changer apparatus of FIG. 1 with a front door 5 open. And FIG. 3 is a perspective view showing the internal mechanism of the disk changer apparatus of FIG. 1 with an exterior case 6 constituting the external appearance thereof removed.

As shown in FIGS. 1 and 2, the disk changer apparatus of this embodiment comprises a stocker array 1 in the vicinity of the front surface of an exterior case 6. The stocker tray 1 is so configured that a plurality of large disks 2 (12 cm in diameter) and small disks 3 (8 cm in diameter) are held vertically in juxtaposition in spaced relationship with each other. The large disks 2 and the small disks 3 will hereinafter be referred to as the disks 2, 3 in the present embodiment.

The stocker tray 1 includes a plurality of holding slots 1b formed by a plurality of partitioning walls 1a, in which the disks 2, 3 are mounted and held. An exterior case 6 is mounted on a chassis 4 with the front surface thereof open. A front door 5 is arranged on the front surface of the chassis 4, and mounted rotatably about a supporting point 5a, so that the disks 2, 3 are adapted to be supplied for replacement by opening the front door 5. As shown in FIGS. 1 and 2, the front door 5 has a transparent window 5b through which the presence or absence of the disks 2, 3 can be visually checked even when the front door 5 of the disk changer apparatus is closed. Also, as shown in FIG. 1, the front door 5 has an operating switch 5c for operating the disk changer apparatus.

Figure 3:
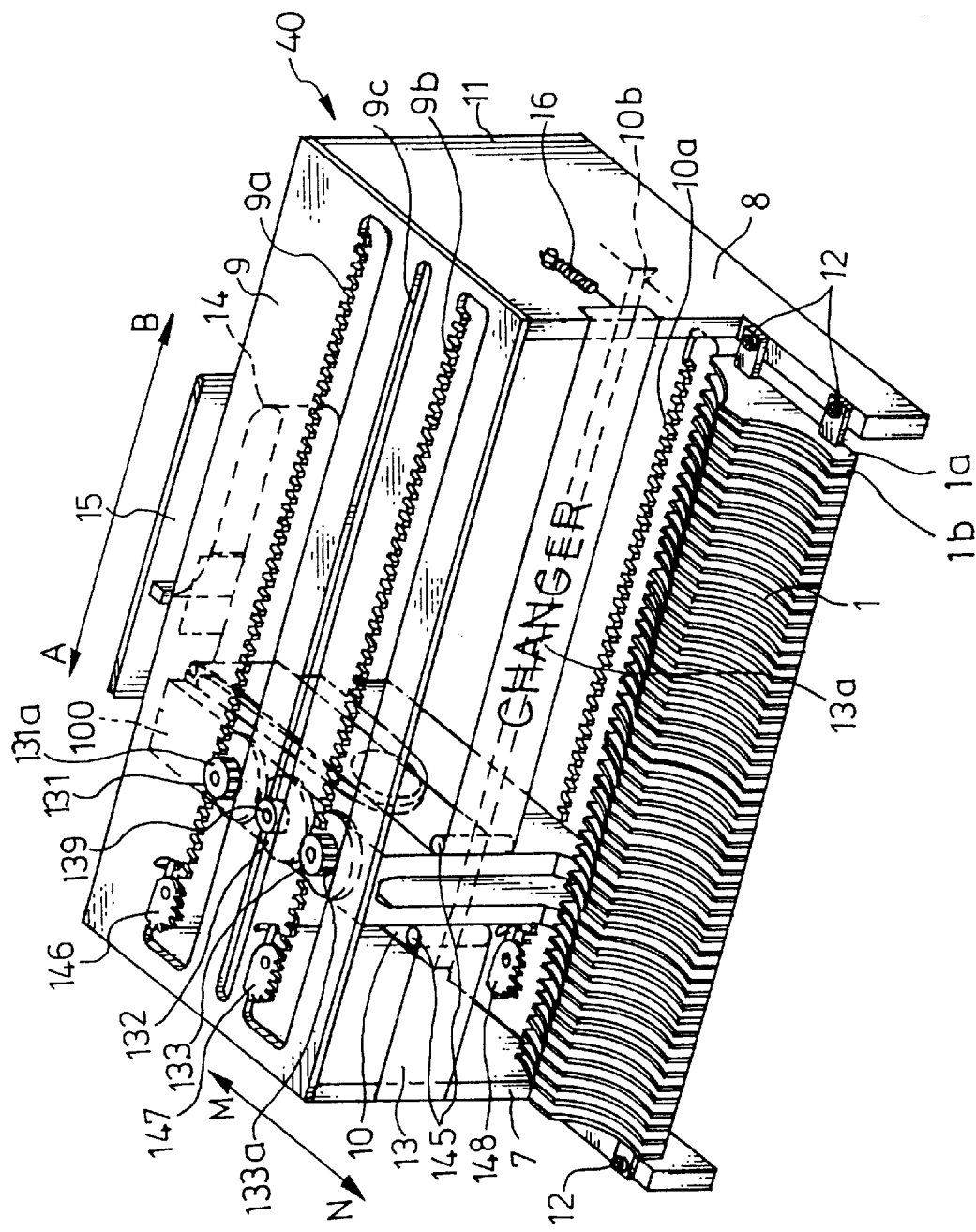
FIG. 3 is a perspective view showing an internal mechanism except the external case of the disk changer apparatus of FIG. 1.

The internal mechanism arranged in the chassis 4 is shown in FIG. 3. As shown in FIG. 3, the internal mechanism includes a left side plate 7, a right side plate 8, an upper rack plate 9, a lower rack plate 10 and a rear reinforcing plate 11. The internal mechanism thus has a substantially box-shaped frame member 40 with the front side thereof open. The stocker tray 1 is suspended between the front protruded portions of the left side plate 7 and the right side plate 8 and is fixed to the left side plate 7 and the right side plate 8 by screws 12. The upper rack plate 9 has a first rack 9a and a second rack 9b formed in parallel. The lower rack plate 10 has a third rack 10a formed in parallel with the first rack 9a and the second rack 9b. The rear reinforcing plate 11 is fixed to the chassis 4 thereby securing the whole frame member 40 to the chassis 4. The teeth of the first rack 9a and the second rack 9b of the upper rack plate 9 and the third rack 10a of the lower rack plate 10 are configured to have the same pitches and the same vertical sectional view.

As shown in FIG. 3, a loading unit 100 is mounted movably in the directions of arrow A or arrow B between the upper rack plate 9 and the lower rack plate 10. The loading unit 100 in the initial state (where the disks are not being played back or the disk changer apparatus of the embodiment is in transit), is arranged at the left end of the upper rack plate 9 and the lower rack plate 10.

A screen belt 13 for protecting a driving mechanism, etc. in the disk changer apparatus is suspended over the front portions of the left side plate 7 and the right side plate 8. The left end of the screen belt 13 is secured to the left side plate 7. The screen belt 13 is arranged slidably around the periphery of the loading unit 100. The right end of the screen belt 13 is suspended fixedly to the right side plate 8 through a spring 16.

Figure 4:
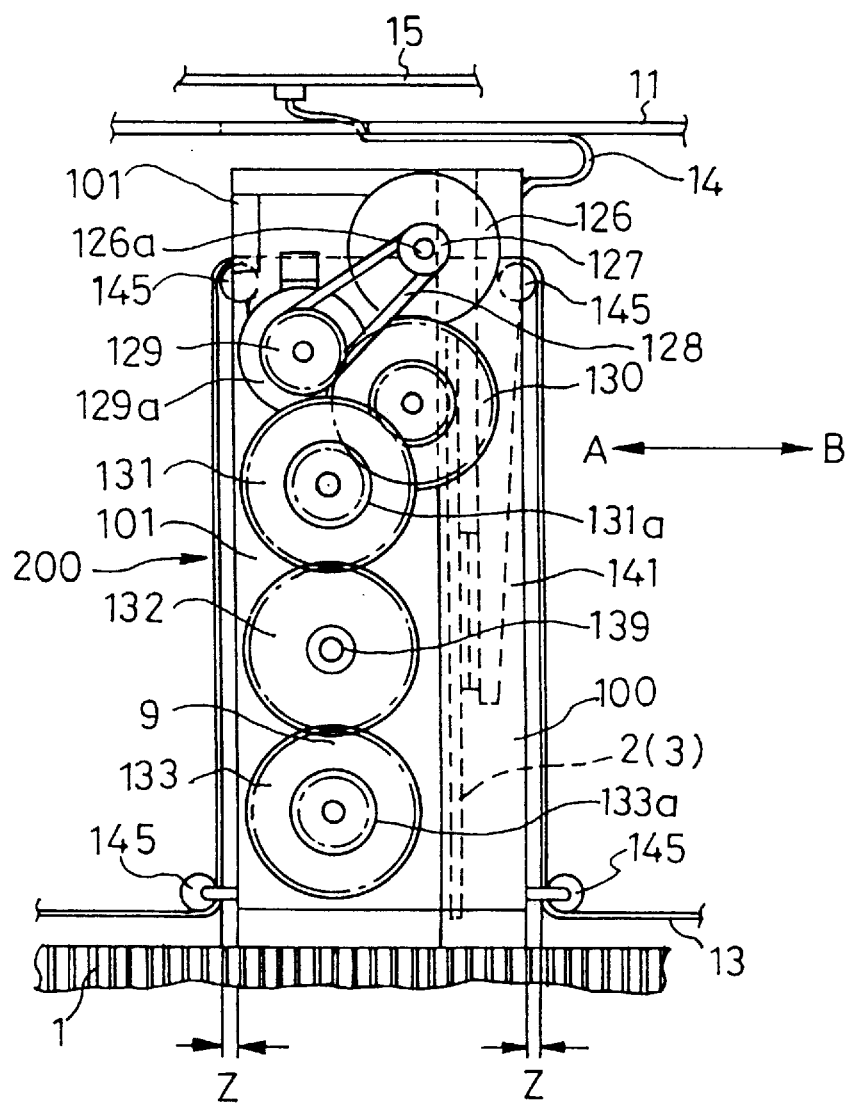
FIG. 4 is a plan view showing a loading unit, etc. of the disk changer apparatus of the embodiment.

FIG. 4 is a top plan view of the loading unit 100, etc. In FIG. 4, the upper rack plate 9 is removed. As shown in FIG. 4, four screen rollers 145, 145, 145, 145 are provided at the front and rear portions on the left side of a mechanism base 101 and at the front and rear portions on the right side of a right disk guide 141, in order to guide the screen belt 13 sliding along the periphery of the loading unit 100. As shown in FIG. 4, the screen belt 13 is tensioned by the four screen rollers 145, 145, 145, 145 arranged on the loading unit 100. The gap Z between the screen belt 13 and the side of the loading unit 100 shown in FIG. 4 is formed smaller than the thickness of the disks 2, 3 to be loaded. For this reason, the disk changer apparatus of this embodiment prevents the disks 2, 3 from intruding into the gap Z.

Figure 5:
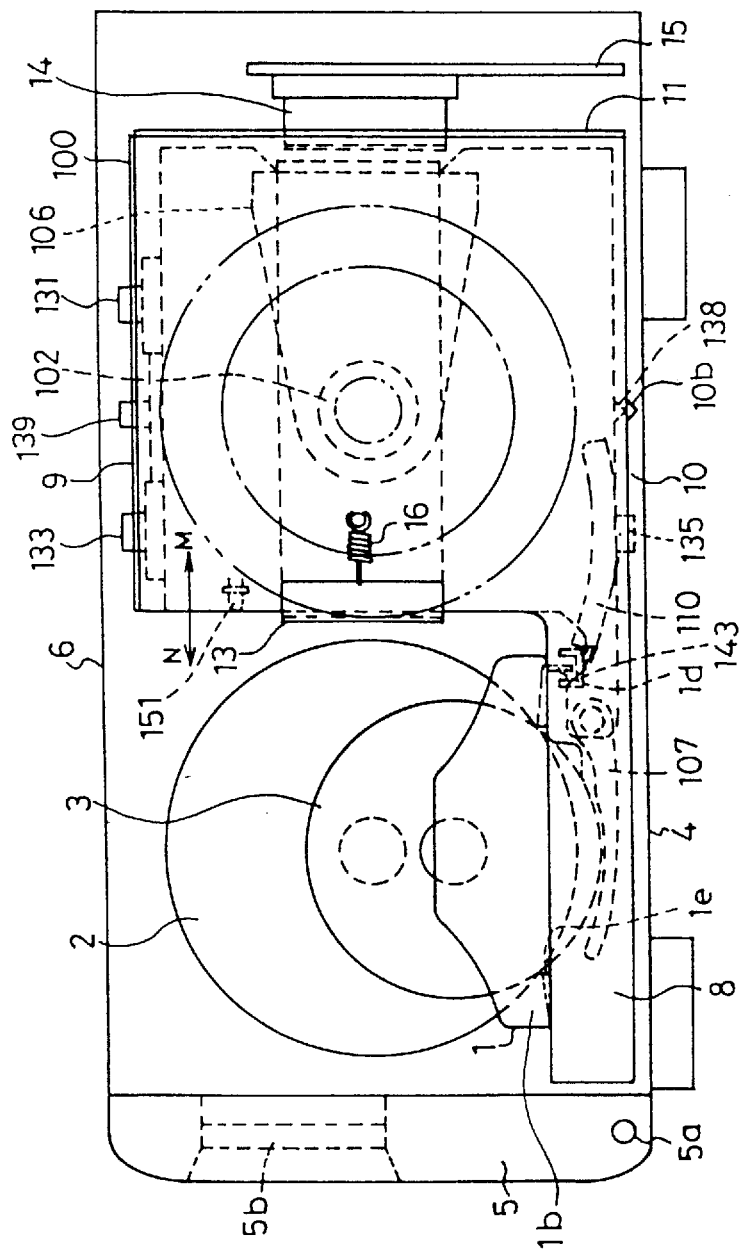
FIG. 5 is a side view showing a configuration of the essential parts of the disk changer apparatus of the embodiment.

FIG. 5 is a side view schematically showing relative positions of the disks 2, 3, the screen belt 13 and the loading unit 100 of the disk changer apparatus of this embodiment. As shown in FIG. 5, the screen belt 13 is tensioned in such a manner that the front thereof is substantially flush with the front surface of the loading unit 100 and also has a sufficient height to contact both the large disk 2 and the small disk 3.

A through hole 1e is formed at the lower end of each holding slot 1b of the stocker tray 1 (see FIG. 22 disclosed later) thereby to hold either the large disk 2 or the small disk 3. For this purpose, the rotational axis of the large disk 2 and the rotational axis of the small disk 3 as held in the stocker tray 1 are arranged in the same plane.

Also, the screen belt 13 is arranged above the upper end of the stocker tray 1, and therefore as shown in FIG. 3, letters 13a or the like can be marked on the screen belt 13 to appeal to the visual sense of the user.

As shown in FIGS. 3 and 4, a flexible signal wire 14 is connected between the loading unit 100 and a circuit board 15 for accommodating the movement of the loading unit 100 along the direction of arrow A or arrow B.

[Configuration of Loading Unit 100]

The loading unit 100 of this embodiment includes a loading unit driving mechanism 200 (FIG. 7) as a means for transporting the loading unit 100 laterally of the disk changer apparatus (along the arrow A or B in FIG. 3), a disk playback mechanism 300 (FIG. 18) having a disk playback unit as a means for playing back the disks 2, 3, a disk playback unit driving mechanism 400 (FIG. 8) for transferring the disk playback unit from playback wait mode to playback mode, and a disk load/return mechanism 500 (FIG. 13) as a means for transporting the disks held and stored in the stocker tray 1 to the disk playback mechanism. These mechanisms will be described in detail below.

[Configuration of Loading Unit Driving Mechanism 200]

As seen from the top plan view of the loading unit 100 shown in FIG. 4, a driving force of a loading unit driving motor 126 fixed on the upper surface of a mechanism base 101 is transmitted to a first driving gear 131 and a second driving gear 133 through a reduction mechanism. An intermediate gear 132 is arranged between the first driving gear 131 and the second driving gear 133. The first driving gear 131 and the second driving gear 133 are constructed to rotate synchronously with each other. The first driving gear 131, the intermediate gear 132 and the second driving gear 133 are arranged rotatably on the upper surface of the mechanism base 101. The reduction mechanism comprises a motor pulley 127 fixed on the shaft 126a of the loading unit driving motor 126, a belt 128 for transmitting the driving force of the loading unit driving motor 126, a pulley gear 129 rotatably mounted on the mechanism base 101 and a reduction gear 130.

As shown in FIG. 3, the gear wheel 131a of the first driving gear 131 is in mesh with the first rack 9a of the upper rack plate 9. As a result, when the first driving gear 131 is rotated by the driving force of the loading unit driving motor 126, the first driving gear 131 drives the loading unit 100 laterally of the disk changer apparatus (along the direction of arrow A or B in FIG. 3).

The second driving gear 133 coupled to the first driving gear 131 through the intermediate gear 132 is also in mesh with the second rack 9b of the upper rack plate 9. Consequently, the second driving gear 133 drives the loading unit 100 along the direction of arrow A or B in synchronism with the first driving gear 131.

Figure 6:
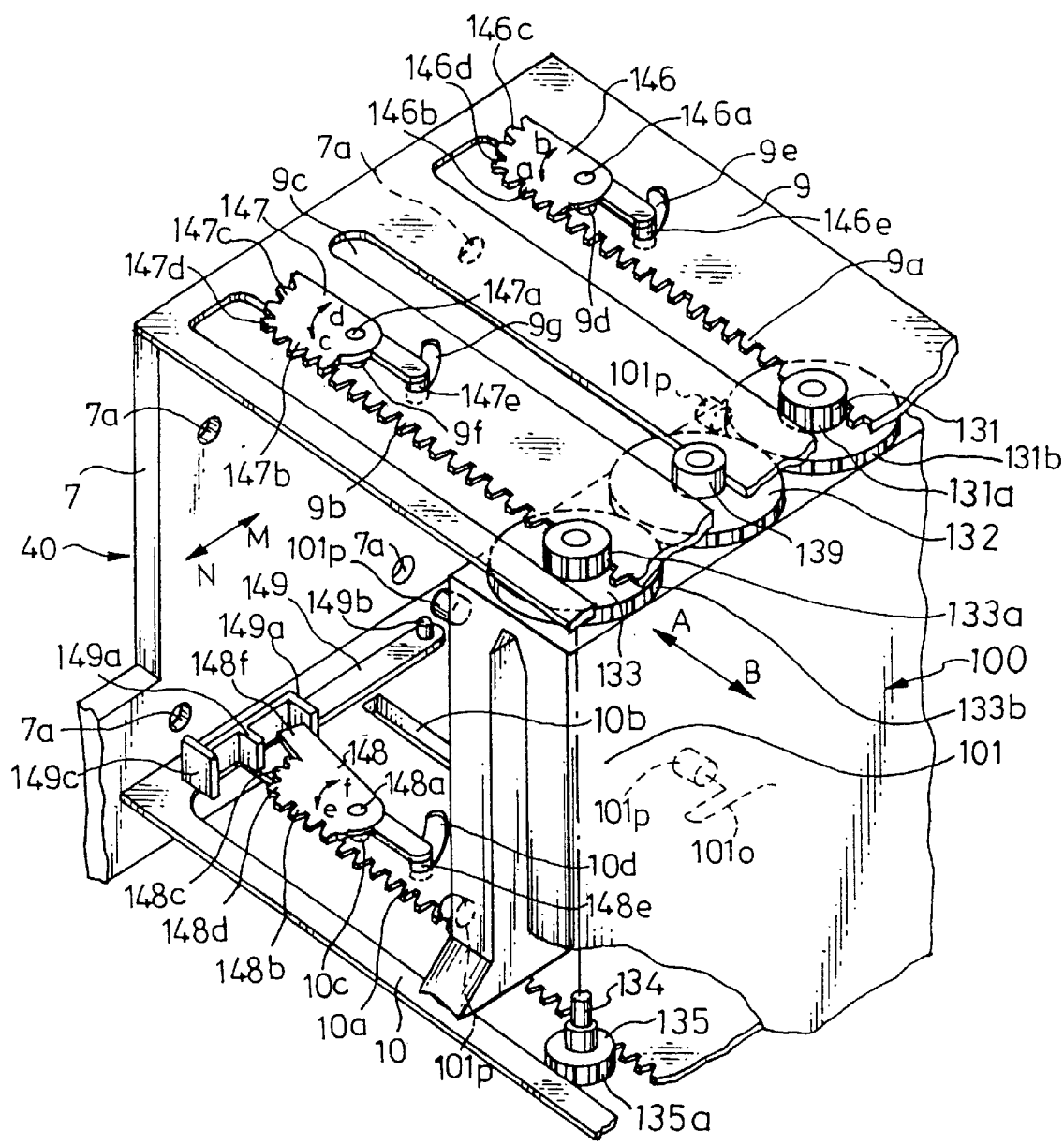
FIG. 6 is a perspective view showing an upper rack, a lower rack, a left plate, a loading unit and the like of the disk changer apparatus of the embodiment.

FIG. 6 is a perspective view showing the loading unit 100 and a frame 40 having the left side plate 7, the lower rack plate 10 and the upper rack plate 9. As shown in FIG. 6, a third driving gear 135 is arranged on the lower surface of the loading unit 100. The third driving gear 135, is operatively interlocked with the second driving gear 133 by a coupling rod 134. The third driving gear 135 is connected to the second driving gear by the coupling rod 134 passed through the mechanism base 101, and is rotatably provided to the mechanism base 101. The gear wheel 135a of the third driving gear 135 is in mesh with the third rack 10a formed in the lower rack plate 10. As a result, when the third driving gear 135 coupled to the second driving gear 133 is rotated, the loading unit 100 is driven laterally of the disk changer apparatus (along arrow A or B in FIG. 6) in an operatively interlocked relation with the first driving gear 131 and the second driving gear 133.

The gear wheel 131a of the first driving gear 131, the gear wheel 133a of the second driving gear 133 and the gear wheel 135a of the third driving gear 135 have the same diameter in the reference pitch circles, and are formed to have the same module. And, the large wheel 131b of the first driving gear 131 and the large wheel 133b of the second driving gear 133, which are in mesh with the intermediate gear 132, are formed to have the same diameter in the reference pitch circles and the same module. As a consequence, the gear wheels 131a, 133a and 135a rotate at the same rate on the same time. Also, the gear wheels 131a, 133a and 135a are arranged in such a position that the teeth thereof assume the same shape in a plane perpendicular to the direction of arrows A and B. The loading unit 100 mounted perpendicular to the direction of arrows A and B, therefore, is moved along the direction of arrow A or B while maintaining the perpendicularity thereof.

Figure 7:
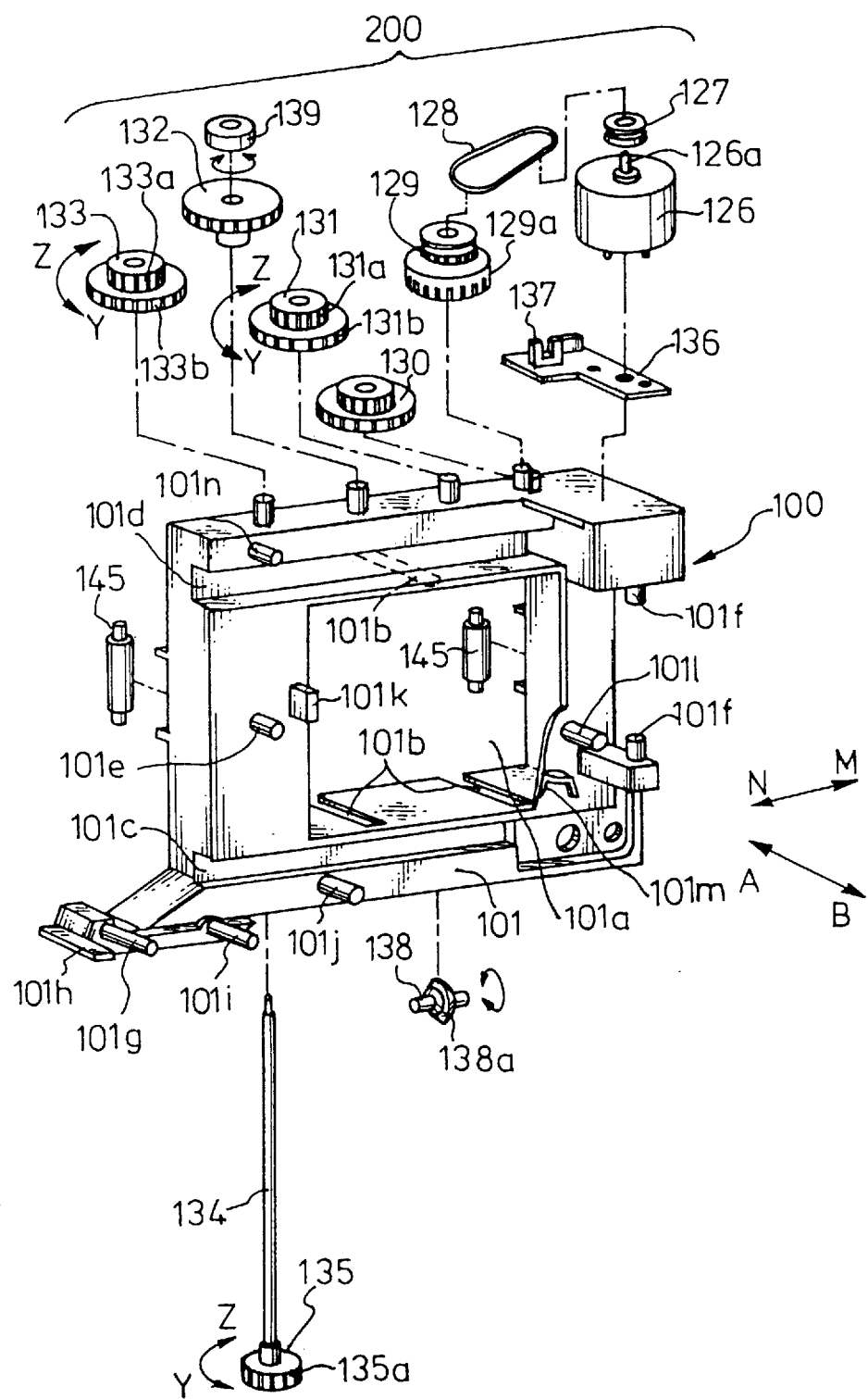
FIG. 7 is an exploded perspective view showing a loading unit driving mechanism and the like of the disk changer apparatus of the embodiment.

FIG. 7 is an exploded perspective view showing the loading unit driving mechanism 200 arranged above the loading unit 100. As shown in FIG. 7, a count ring 129a having comb-like gaps along the circumference thereof is fixedly mounted on the same axis under the pulley gear 129. In the disk changer apparatus of this embodiment, a count sensor 137 mounted in similar fashion on the printed board 136 carrying a loading unit driving motor 126 detects the rotation of the count ring 129a. The running speed and the position of the loading unit 100 along the arrow A or B thus are detected thereby controlling the movement thereof. According to this embodiment, the count sensor 137 and the count ring 129a are used as a disk position search means.

A lower roller 138 adapted to roll in the same direction as the movement of the loading unit 100 is mounted under the mechanism base 101. This lower roller 138 moves while rolling along a V-shaped groove 10b formed in the lower rack plate 10 and supports the weight of the loading unit 100. The circumferential portion 138a of the lower roller 138 is formed in the shape like a letter V to closely contact the V-shaped groove 10b. The loading unit 100 therefore is prohibited by the lower roller 138 from moving longitudinally of the disk changer apparatus (along the directions of arrows N and M in FIG. 7).

As shown in FIG. 7, the upper roller 139 is rotatably mounted on the same axis as the intermediate gear 132 above the mechanism base 101. This upper roller 139 is constructed to slide along the guide slot 9c (FIG. 3) formed in the upper rack 9. In this way, the provision of the upper roller 139 and the lower roller 138 above and below the loading unit 100, respectively, completely prohibits the movement of the loading unit 100 along the directions of arrow N and M.

[Configuration of Disk Playback Mechanism 300]

Figure 8:
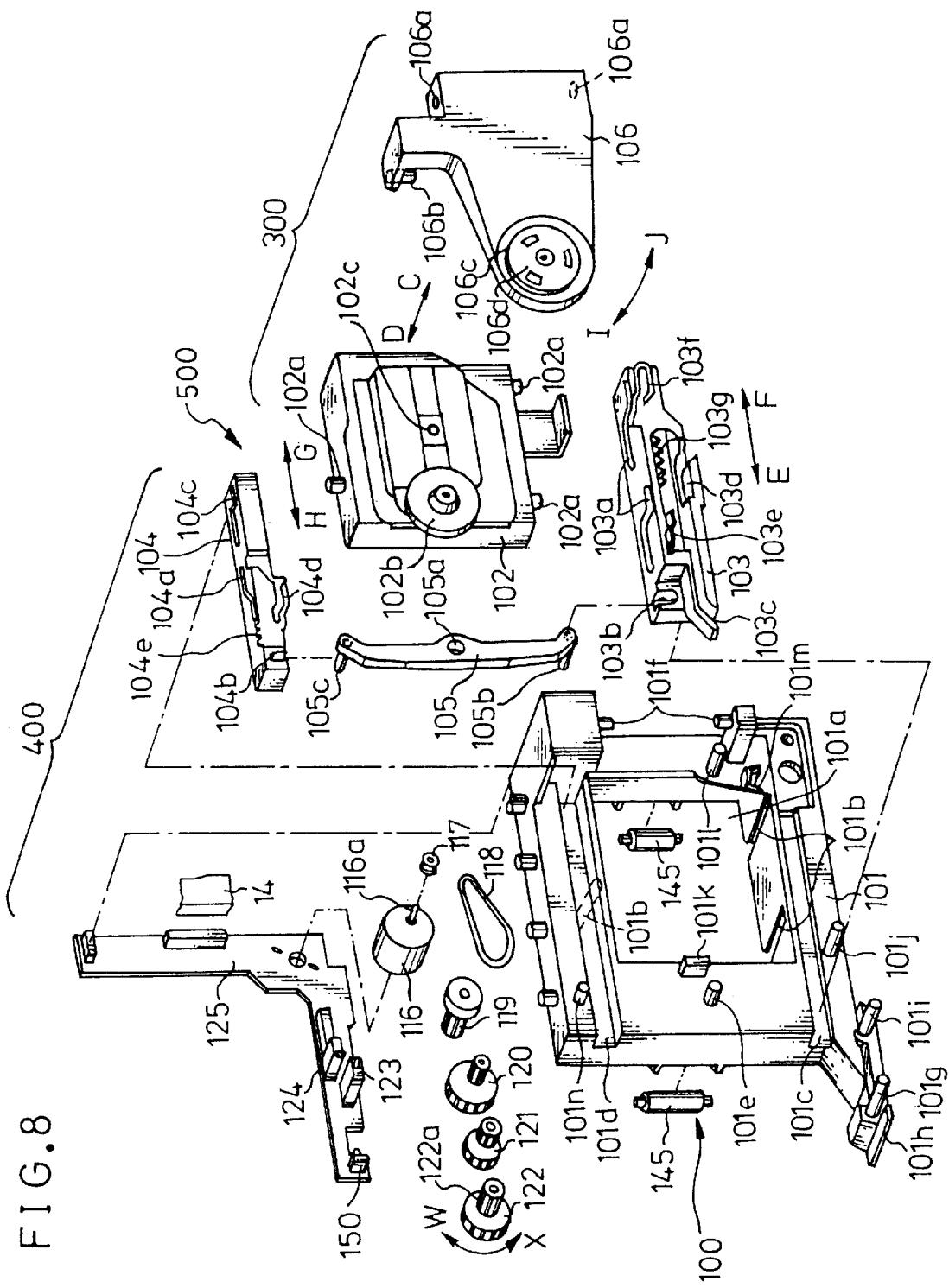
FIG. 8 is an exploded perspective view showing a disk playback mechanism of the loading unit of the disk changer apparatus of the embodiment.

FIG. 8 is an exploded perspective view of the mechanism base 101 of the loading unit 100, the disk playback mechanism 300 and the playback unit driving mechanism 400. In FIG. 8, the disk playback mechanism 300 includes a disk playback unit 102 and a clamp plate 106.

As shown in FIG. 8, a rectangular hole 101a is formed at the central portion of the mechanism base 101 providing the frame of the loading unit 100. The disk playback unit 102 including a turn table 102b and a light pickup 102c is arranged in the rectangular hole 101a. A total of three pins 102a are projected from the upper and lower surfaces of the disk playback unit 102. These pins 102a are provided to slide in mesh with three guide slots 101b formed in the mechanism base 101 so that the disk playback unit 102 is movable along the direction of arrow C or D in FIG. 8.

The rotatable clamp plate 106 is mounted on the mechanism base 101, and two holes 106a of the clamp plate 106 are inserted by supports 101f of the mechanism base 101 so that the clamp plate 106 is rotatably supported by the supports 101f. The clamp plate 106 has a hole 106c formed therein. A clamper 106d is rotatably mounted in the hole 106c of the clamp plate 106. In the playback mode, the clamper 106d holds and rotatably supports the disks 2, 3 disposed on the turn table 102b of the disk playback unit 102.

[Configuration of Disk Playback Driving Mechanism 400]

In FIG. 8, the disk playback driving mechanism 400 includes a slide plate driving motor 116, a lower slide plate 103 and an upper slide plate 104. The disk playback driving mechanism 400 has the function for switching the disk playback mechanism 300 from playback wait mode to playback mode.

The lower slide plate 103 is mounted slidably along the direction of arrow E or F in the lower guide groove 101c formed in the mechanism base 101. The lower slide plate 103 has two cam slits 103a, 103a formed in steps. These cam slits 103a, 103a are arranged to be slidably engaged with the two pins 102a disposed on the lower surface of the disk playback unit 102.

The upper slide plate 104 is mounted slidably along the direction of arrow G or H in the upper guide groove 101d formed in the mechanism base 101. The upper slide plate 104 has a cam slit 104a formed in a step. This cam slit 104a is arranged to be slidably engaged with the pin 102a disposed on the upper surface of the disk playback unit 102.

The lower slide plate 103 and the upper slide plate 104 are connected in operatively interlocked relation to each other by a coupling lever 105. The coupling lever 105 has a central hole 105a which is rotatably supported on the shaft 101e of the mechanism base 101. A pin 105b at the lower end of the coupling lever 105 is engaged with the slot 103b of the lower slide plate 103. A pin 105c at the upper end of the coupling lever 105 is engaged with the slot 104b of the upper slide plate 104. As a result, by the movement of the lower slide plate 103 along the direction of arrow E, the upper slide plate 104 connected to the lower slide plate 103 through the coupling lever 105 moves along the direction of arrow G. In this way, with the movement of the lower slide late 103 and the upper slide plate 104 in opposite directions, the disk playback unit 102 moves along the direction of arrow C thereby transferring the disk playback unit 102 from playback wait mode to playback mode. The cam slit 103a of the lower slide plate 103 and the cam slit 104a of the upper slide plate 104 are formed in opposite directions in such a manner that the disk playback unit 102 moves in the direction perpendicular to the sliding direction of the lower slide plate 103 and the upper slide plate 104.

On the other hand, when the lower slide plate 103 moves in the opposite direction of arrow F, the upper slide plate 104 moves along the direction of arrow H, and the disk playback unit 102 moves along the direction of arrow D into playback wait mode.

Figure 9:
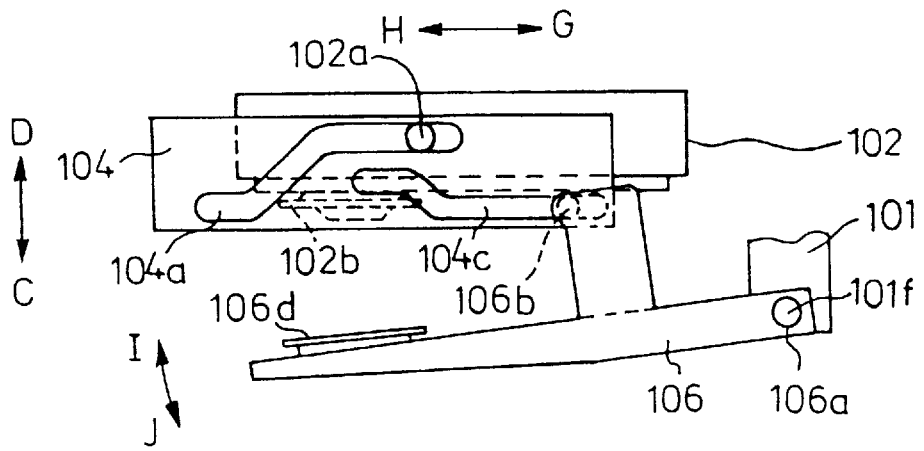
FIG. 9 is a plan view showing a disk playback unit and the like in playback wait mode of the loading unit of the disk changer apparatus of the embodiment.
Figure 10:
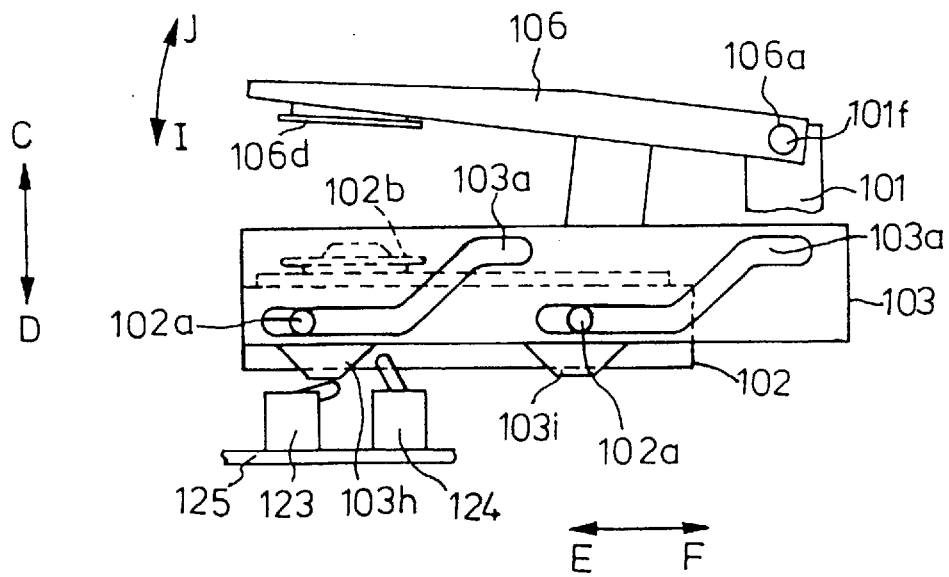
FIG. 10 is a rear view showing the disk playback unit and the like in playback wait mode of the loading unit of the disk changer apparatus of the embodiment.
Figure 11:
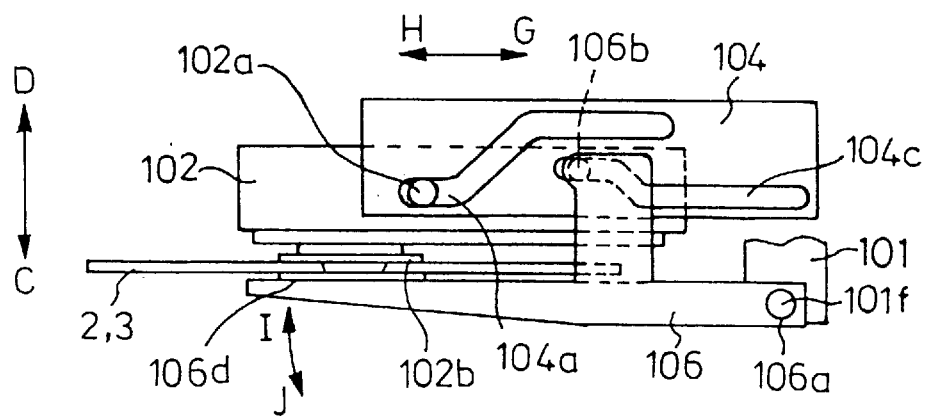
FIG. 11 is a plan view showing the disk playback unit and the like in playback mode of the loading unit of the disk changer apparatus of the embodiment.
Figure 12:
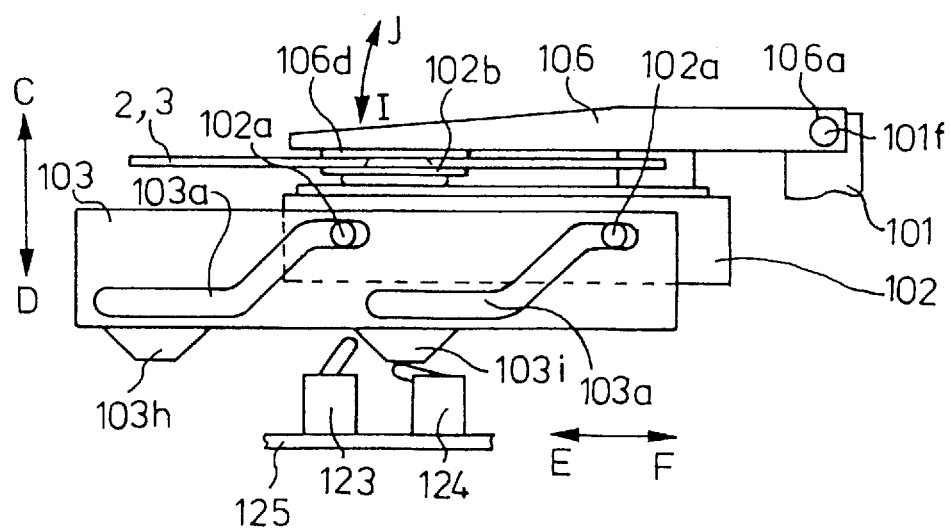
FIG. 12 is a rear view showing the disk playback unit and the like in playback mode of the loading unit of the disk changer apparatus of the embodiment.

Next, the operation of the disk playback unit 102 transferring from playback wait mode to playback mode will be explained with reference to the schematic diagram of FIGS. 9 to 12. FIG. 9 is a plan view showing the disk playback unit 102, the upper slide plate 104 and the clamp plate 106 in playback wait mode. FIG. 10 is a bottom plan view of the disk playback unit 102, the lower slide plate 103 and the clamp plate 106 in playback wait mode. FIG. 11 is a plan view showing the disk playback unit 102, the upper slide plate 104 and the clamp plate 106 in playback mode. FIG. 12 is a rear view showing the disk playback unit 102, the lower slide plate 103 and the clamp plate 106 in playback mode.

As shown in the plan views of FIGS. 9 and 11, the upper slide plate 104 has the stepped cam slit 104a, which is slidably engaged with the pin 102a of the disk playback unit 102. As shown in the rear views of FIGS. 10 and 12, on the other hand, the lower slide plate 103 has two stepped cam slits 103a, 103a, which are slidably engaged with the two pins 102a of the disk playback unit 102, respectively. As a result, the disk playback unit 102 is driven along the direction of arrow C or D by the opposite movements of the lower slide plate 103 and the upper slide plate 104. Consequently, the disk playback unit 102 transfers between playback mode and playback wait mode. In the playback mode shown in FIGS. 11 and 12, the clamp plate 106 holds the disks 2, 3 with the turn table 102b.

As shown in FIG. 9, the pin 106b of the clamp plate 106 is engaged slidably with the cam slit 104c of the upper slide plate 104. As a result, by the movement of the upper slide plate 104 along the direction of arrow G, the clamp plate 106 rotates along the direction of arrow I and enters the playback mode shown in FIG. 11. When the upper slide plate 104 moves along the direction of arrow H in playback mode of FIG. 11, the clamp plate 106 rotates along the direction of arrow J and returns to playback wait mode as shown in FIG. 9.

As shown in FIG. 8, the slide plate driving motor 116 as a driving source for the disk playback driving mechanism 400 is mounted on the printed board 125 fixed on the left side of the mechanism base 101. The driving force of the slide plate driving motor 116 is transferred to the main driving gear 122 through a reduction mechanism including a motor pulley 117 mounted on a shaft 116a, a belt 118, a pulley gear 119 mounted rotatably on the mechanism base 101, a first reduction gear 120 and a second reduction gear 121.

The gear wheel 122a of the main driving gear 122 is in mesh with the rack 103g formed on the lower side of the lower slide plate 103. And the lower slide unit 103 is provided to move along the direction of arrow E or F by the rotation of the main driving gear 122.

As shown in FIG. 10, in the playback wait mode in which the movement of the lower slide plate 103 along the direction of arrow F has been completed, the free switch 123 mounted on the printed board 125 turns on by the engagement of the first projection 103h of the lower slide plate. The rotation of the slide plate driving motor 116 thus is stopped. At the same time, the clamp switch 124 on the printed board 125 is in off state.

In the playback mode shown in FIG. 12, when the movement of the lower slide plate 103 along the direction of arrow E has been completed, the clamp switch 124 is engaged with the second projection 103i of the lower slide plate 103 and thus turns on. As a result, the rotation of the slide plate driving motor 116 is stopped. At the same time, the free switch 123 is in off state.

[Configuration of Disk Load/Return Mechanism 500]

Next, the disk load/return mechanism 500, by which the disks 2, 3 held in the stocker tray 1 are loaded on the disk playback mechanism 300 and returned to the stocker tray 1, will be explained with reference to the accompanying drawings.

Figure 13:
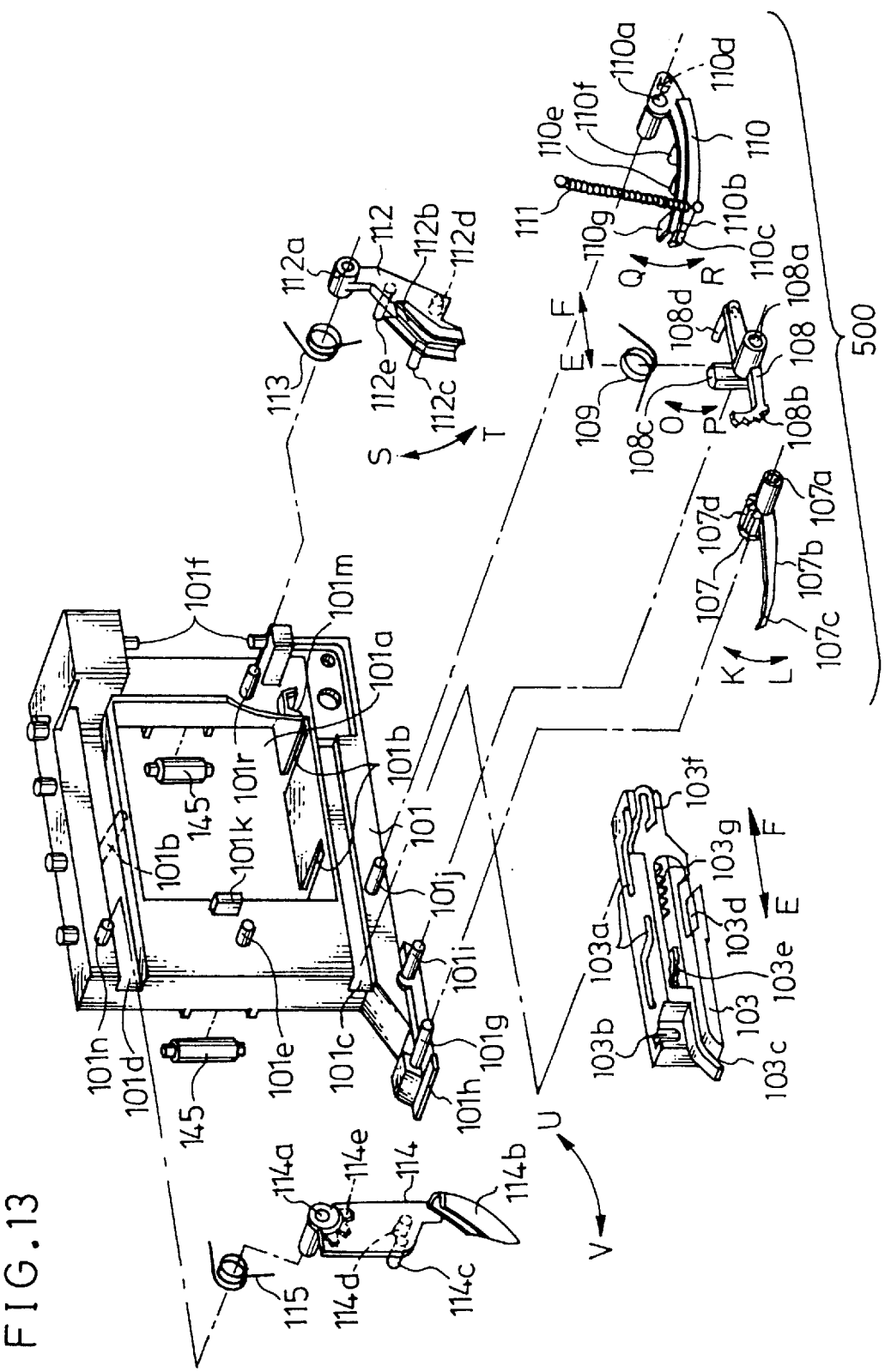
FIG. 13 is an exploded perspective view showing a disk mount and return mechanism and the like of the loading unit of the disk changer apparatus of the embodiment.

FIG. 13 is an exploded perspective view showing an arrangement of the disk load/return mechanism 500 with respect to the mechanism base 101.

The disk load/return mechanism 500 includes a forward feed lever unit 107 as the first lift lever, a rearward feed lever unit 110 as the second lift lever, a size detection lever 112 and a return lever unit 114. These levers will be described in detail below.

[Forward Feed Lever Unit 107]

In FIG. 13, a feed assisting lever unit 108 arranged under the stocker tray 1 has an insertion hole 108a into which a shaft 101i formed on the mechanism base 101 is inserted, and thus is supported rotatably in the direction of arrow O or P.

The driving pin 108d of the feed assisting lever unit 108 engages an inclined cam 103c formed at the forward end of the lower slide plate 103. As a result, the movement of the lower slide plate 103 along the direction of arrow E or F causes the feed assisting lever unit 108 to rotate along the direction of arrow P or O. The feed assisting lever unit 108 is kept urged along the direction of arrow O by a spring 109.

The gear teeth 108b formed at the forward end of the feed assisting lever unit 108 are in mesh with the gear teeth 107d of the forward feed lever unit 107. Consequently, by the rotation of the feed assisting leer unit 108 along the direction of arrow P or O, the forward feed lever unit 107 is rotated in the direction of arrow K or L. The stop position of the forward feed lever unit 107 thus is determined by the stop position of the feed assisting lever unit 108. A lever 107c of forward feed lever unit 107 is arranged, however, under the stocker tray 1 in initial state.

The insertion hole 107a of the forward feed lever unit 107 is inserted be the shaft 101g of the mechanism base 101, and the forward feed lever unit 107 is mounted rotatably along the direction of arrow K or L. In the condition that the feed assisting lever unit 108 is not contacted with the inclined cam 103c of the lower slide plate 103, the feed assisting lever unit 108 is in a position rotated by a predetermined angle in the direction of arrow O. As a result, the lever 107c of the forward feed lever unit 107 moves along the direction of arrow L and is kept stationary in contact with the rib 101h of the mechanism base 101. For this reason, the lever 107c of the forward feed lever unit 107 is arranged under the stocker tray 1 and the disks 2, 3 held in the stocker tray 1. Under this condition, the lever 107c is provided to move laterally of the disk changer apparatus (along the direction of arrow A or B in FIG. 3).

When the loading unit 100 moves in lateral direction and reaches a designated position of the stocker tray 1, the lever 107c rotates along the direction of arrow K from under the stocker tray 1 and accesses the disk 2, 3 from under the holding slots 1b of the stocker tray 1. The forward feed lever unit 107 having the above-mentioned constructions moves the disks 2, 3 held in the stocker tray 1 in the direction of arrow M (FIG. 5) by the rotation of the lever 107c.

Figure 14:
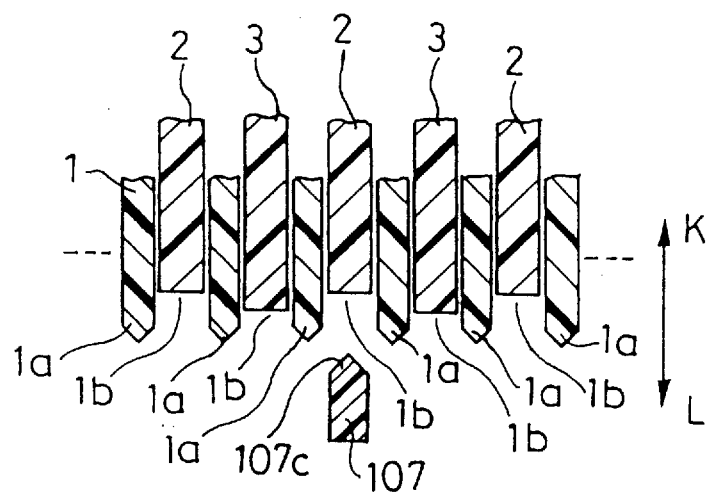
FIG. 14 is a partially enlarged sectional view showing the disk mount and return mechanism and the like of the loading unit of the disk changer apparatus of the embodiment.

FIG. 14 is a longitudinal sectional view showing the arrangement of the stocker tray 1, the disks 2, 3 and the lever 107c of the forward feed lever unit 107 in the process of disk transport operation. As shown in FIG. 14, the lower end of the partitioning walls 1a of the stocker tray 1 and the upper end of the lever 107c are chamfered in such a manner that the lever 107c can advance easily and positively into the holding slots 1b.

Figure 15:
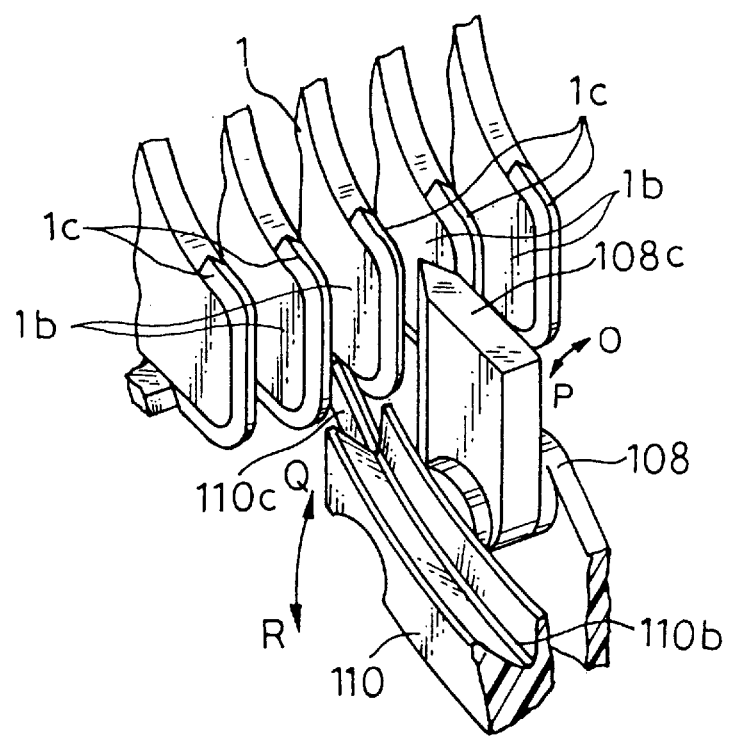
FIG. 15 is a partially enlarged perspective view showing the disk mount and return mechanism of the loading unit of the disk changer apparatus of the embodiment.

FIG. 15 is an enlarged perspective view showing relative positions of the stocker tray 1 and the feed assisting lever unit 108. As shown in FIG. 15, a positioning rib 108c is formed on the feed assisting lever unit 108 and is provided to engage a rear rib 1c of the stocker tray 1 when the feed assisting lever unit 108 rotates along the direction of arrow P. As a result, even when the disk changer apparatus is shocked during the desk transfer operation, a designated disk can be supplied to the disk playback mechanism without fail. The forward end of the positioning rib 108c of the feed assisting lever unit 108 and the rear rib 1c of the stocker tray 1 are chamfered so that the positioning rib 108c can accurately advance into the gap adjacent to the stocker tray 1 holding a designated disk.

[Rearward Feed Lever Unit 110]

As shown in FIG. 13, the rearward feed lever unit 110 has an insertion hole 110a which is inserted by the shaft 101j of the mechanism base 101, so that the rearward feed lever unit 110 is rotatably provided along the direction of arrow Q or R. The rearward feed lever unit 110 is kept urged to rotate along the direction of arrow Q by a spring 111 which is fixed at its one end to the right disk guide 141 described later.

A driving pin 110d is arranged at the rear end of the rearward feed lever unit 110. The driving pin 110d engages a cam slit 103d formed in the lower slide plate 103. As a result of this engagement, the movement of the lower slide plate 103 along the direction of arrow E or F drives the rearward feed lever unit 110 to rotate along the direction of arrow Q or R. Also, the rearward feed lever unit 110 has a large guide pin 110e and a small guide pin 110f. The large guide pin 110e or the small guide pin 110f is provided to engage the guide cam slit 103e formed in the lower slide plate 103. In the disk transporting operation, therefore, the rearward feed lever unit 110 is rotated by appropriate angular degrees in accordance with the shape of the designated disk.

The rib 110g formed in the vicinity of the forward end of the rearward feed lever unit 110 comes into contact with the stopper 101k of the mechanism base 101 to determine the stop position of the rearward feed lever unit 110 when the reward feed lever unit 110 rotates along the direction of arrow Q.

Figure 16:
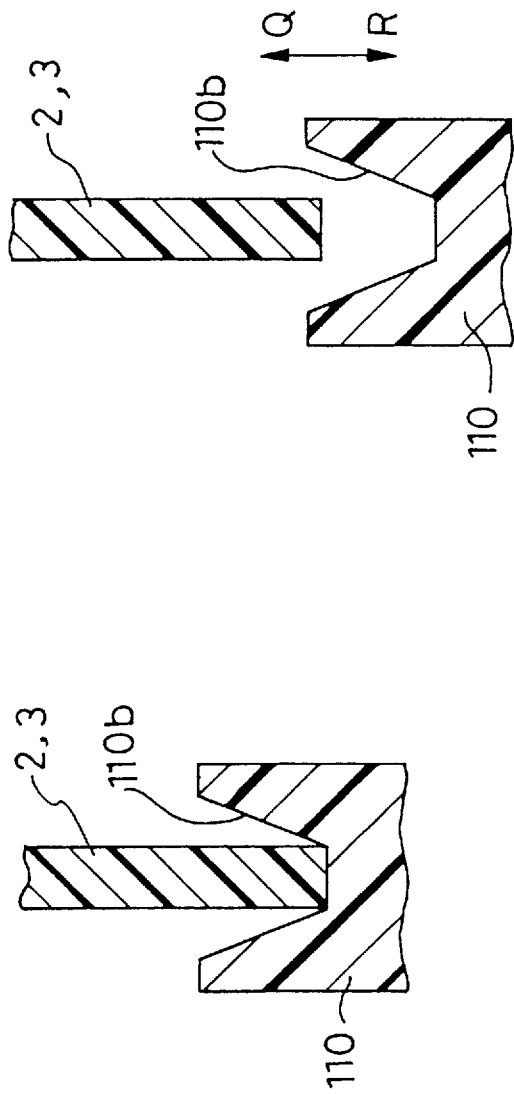
FIGS. 16A and 16B is a partially enlarged sectional view showing the disk mount and return mechanism of the loading unit of the disk changer apparatus of the embodiment.

The upper surface of the rearward feed lever unit 110 has a V-shaped groove 110b for guiding the disk 2 or 3, which groove has a V-shaped section as shown in FIGS. 16A and 16B. The inclined surfaces of the V-shaped groove 110b securely hold and stably guide the disk 2 or 3.

As shown in FIG. 13, a guide 110c is projected toward the front of the disk changer apparatus from the forward end of the rearward feed lever unit 110. The guide 110c advances between the rear end ribs 1c of the stocker tray 1 designated as a result of the rotation of the rearward feed lever unit 110. As shown in FIG. 15, the upper surface of the guide 110c and the lower surface of the rear end ribs 1c are chamfered. The guide 110c of the rearward feed lever unit 110, therefore, can easily advance into the holding slots 1b of the stocker tray 1 smoothly from thereunder.

When the rearward feed lever unit 110 is rotated along the direction of arrow R and the guide 110c is positioned at the lowest position thereof, the guide 110c is ready to move the lower part of the stocker tray 1 laterally of the disk changer apparatus (along the directions of arrows A and B in FIG. 3).

[Size Detection Lever Unit 112]

In FIG. 13, a size detection lever unit 112 has an insertion hole 112a, which is inserted by the shaft 101r of the mechanism base 101, so that the size detection lever unit 112 is rotated along the direction of arrow S or T. The size detection lever unit 112 is kept urged to rotate along the direction of arrow S by the spring 113. The forward end of the size detection lever unit 112 is formed to have a V-shaped groove 112b for transporting the disk 2, 3. This V-shaped groove 112b has a substantially V-shaped section like the V-shaped groove 110b of the rearward feed lever unit 110 described above. The inclined surfaces of the V-shaped groove 112b is provided to hold the designated disk 2, 3 and guide it to a predetermined position accurately.

The size detection lever unit 112 has a large guide pin 112c and a small guide pin 112d. The large guide pin 112c or the small guide pin 112d is so constructed as to be engaged with a branch cam slit 103f of the lower slide plate 103 while the disk 2, 3 are being transported. As a result of movement of the lower slide plate 103 along the direction of arrow E or F, therefore, the size detection lever unit 112 is held at a predetermined position according to the disk shape thereby to guide the designated disk.

The size detection lever unit 112 has a contact pin 112e for regulating the range of rotation along the direction of arrow S. The contact pin 112e is arranged to come into contact with the regulating rib 101m of the mechanism base 101.

[Return Lever Unit 114]

In FIG. 13, a return lever unit 114 has an insertion hole 114a which is inserted by a shaft 101n of the mechanism base 101, so that the return lever unit 114 is rotatable provided along the direction of arrow U or V. The return lever unit 114 is kept urged to rotate along the direction of arrow V by a spring 115. The return lever unit 114 is formed to have a V-shaped groove 114b for transporting the disk 2, 3. The V-shaped groove 114b, like the V-shaped groove 110b of the rearward feed lever unit 110 described above, has a substantially V-shaped section. The V-shaped groove 114b holds the disk 2, 3 by means of the inclined surfaces thereof thereby to guide the disk 2, 3 to a predetermined position accurately.

The return lever unit 114 is formed with a large guide pin 114c and a small guide pin 114d. The large guide pin 114c or the small guide pin 114d are constructed to engage the branch cam slit 104d of the upper slide plate 104 (FIG. 8). As a result, the movement of the upper slide plate 104 (FIG. 8) along the direction of arrow G or H causes the return lever unit 114 to rotate along the direction of arrow U or V according to the disk shape.

The gear wheel 114e formed on the return lever unit 114 is in mesh with the rack 104e of the upper slide plate 104 (FIG. 8), and therefore the return lever unit 114 is provided to rotate along the direction of arrow U or V by the movement of the upper slide plate 104 along the direction of arrow G or H.

[Other Mechanisms of Loading Unit 100]

Figure 17:
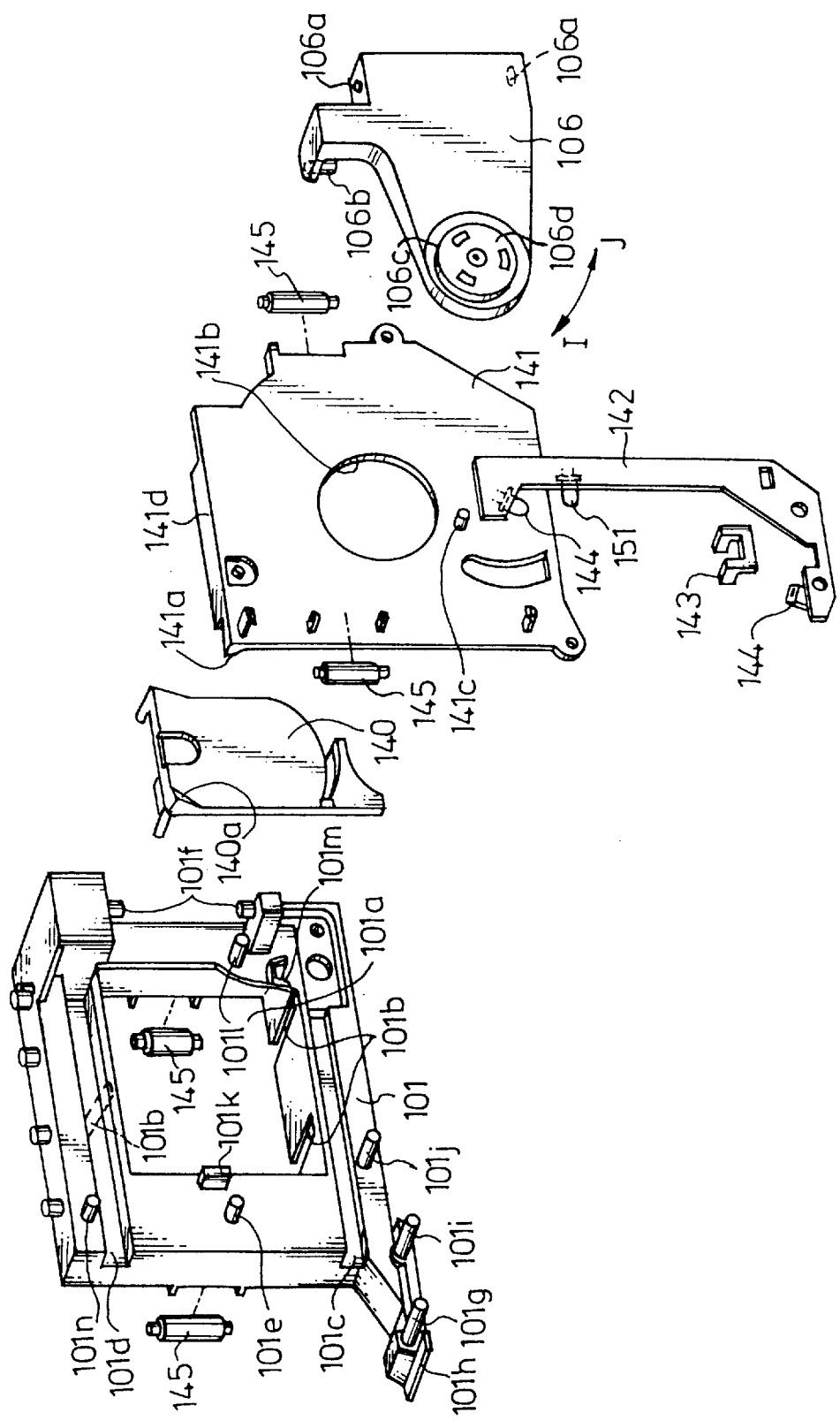
FIG. 17 is an exploded perspective view showing left and right disk guides and the like of the loading unit of the disk changer apparatus embodiment.

FIG. 17 is an exploded perspective view showing an arrangement of the mechanism base 101, a left disk guide 140 and a right disk guide 141 of the loading unit 100.

In FIG. 17, the left disk guide 140 fixedly arranged on the front right side of the mechanism base 101 is for preventing the designated disk 2, 3 from tilting leftward while being transported for transfer from the stocker tray 1 to playback mode. An inclined surface 140a for guiding the disk 2, 3 in transit into position is formed at the upper end of the left disk guide 140.

The right disk guide 141 is arranged on the right side of the left disk guide 140, and is fixed to the mechanism base 101 like the left disk guide 140. The right disk guide 141 is for preventing the designated disk 2, 3 from tilting rightward while being transported for transfer from the stocker tray 1 to playback mode. An inclined surface 141a for guiding the disk 2, 3 in transit into position is formed at the front upper end of the right disk guide 141. Also, a hole 141b for allowing the damper 106d of the clamp plate 106 described above to pass therethrough is formed at the central portion of the right disk guide 141. A spring holder 141c for mounting an end of the spring 111 for urging the rearward feed lever unit 110 (FIG. 13) along the direction of arrow Q is arranged under the hole 141b.

As shown in FIG. 17, the guide plate 141d is formed on the upper surface of the right disk guide 141. This guide plate 141d is interposed between the upper surface of the right disk guide 141 and the upper surface of the left disk guide 140. As a consequence, the guide plate 141d restricts the upward movement of the disk 2, 3 while being transported.

Figure 21:
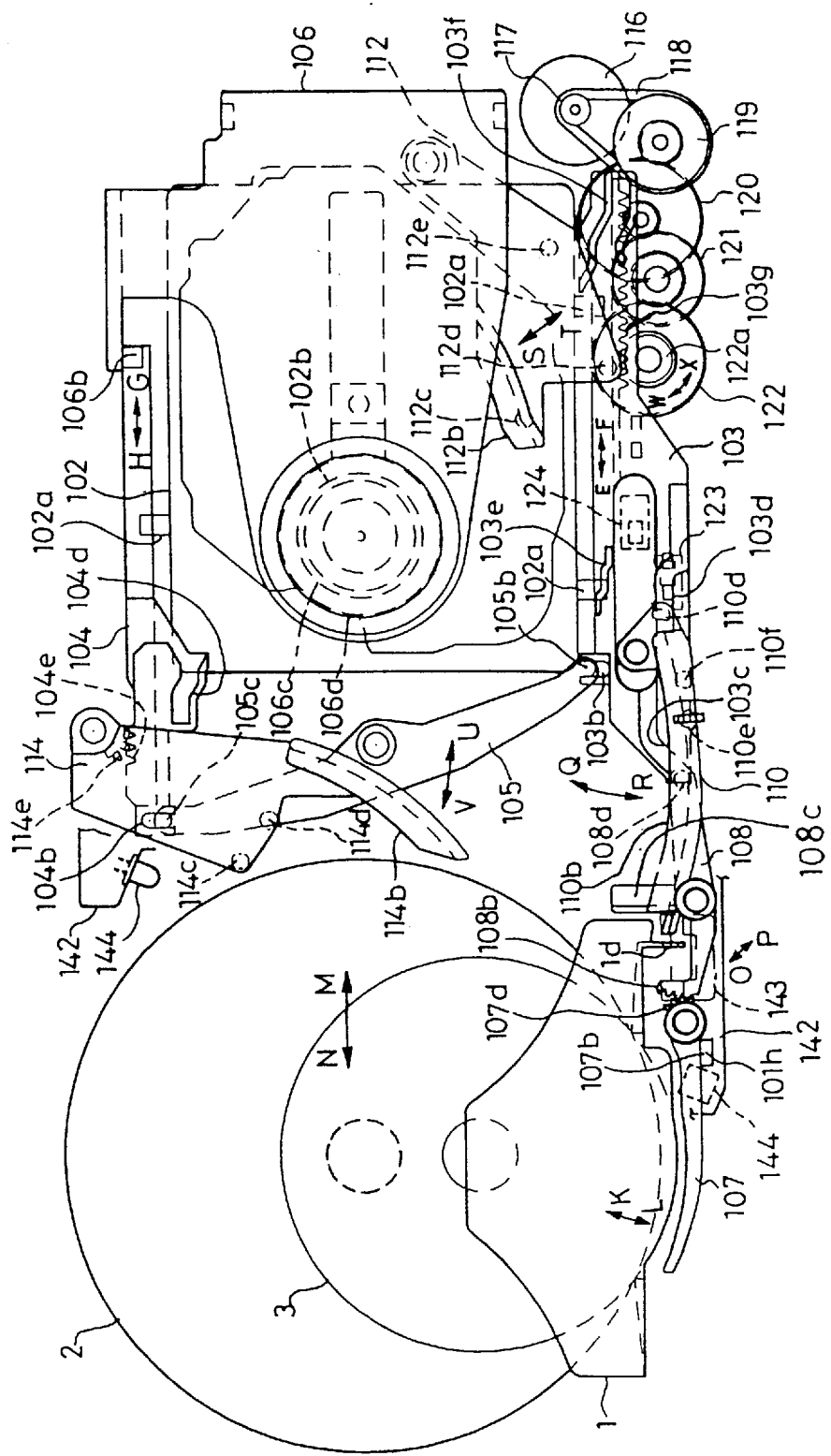
FIG. 21 is a side view showing the disk changer apparatus of the embodiment in the initial state of transport operation.

As shown in FIG. 17, a sensor printed board 142 is mounted on the front right side of the right disk guide 141. A position sensor 143 and a disk sensor 144 for determining the position of the disk 2, 3 are mounted on the sensor printed board 142. The position sensor 143 is for detecting the lateral position (along arrow A or B in FIG. 3) of the loading unit 100 by detecting the sensor rib 1d (FIG. 5) protruded from the lower end of each stocker tray 1. The disk sensor 144 is for detecting whether the disks 2, 3 are mounted on each stocker tray 1 or not while the loading unit 100 is moving along the direction of arrow A or B. According to this embodiment, a light sensor as the disk sensor 144 is arranged so as to sandwich the disk 2, 3 in the stocker tray 1 by the upper and lower sides thereof (FIG. 21).

Figure 18:
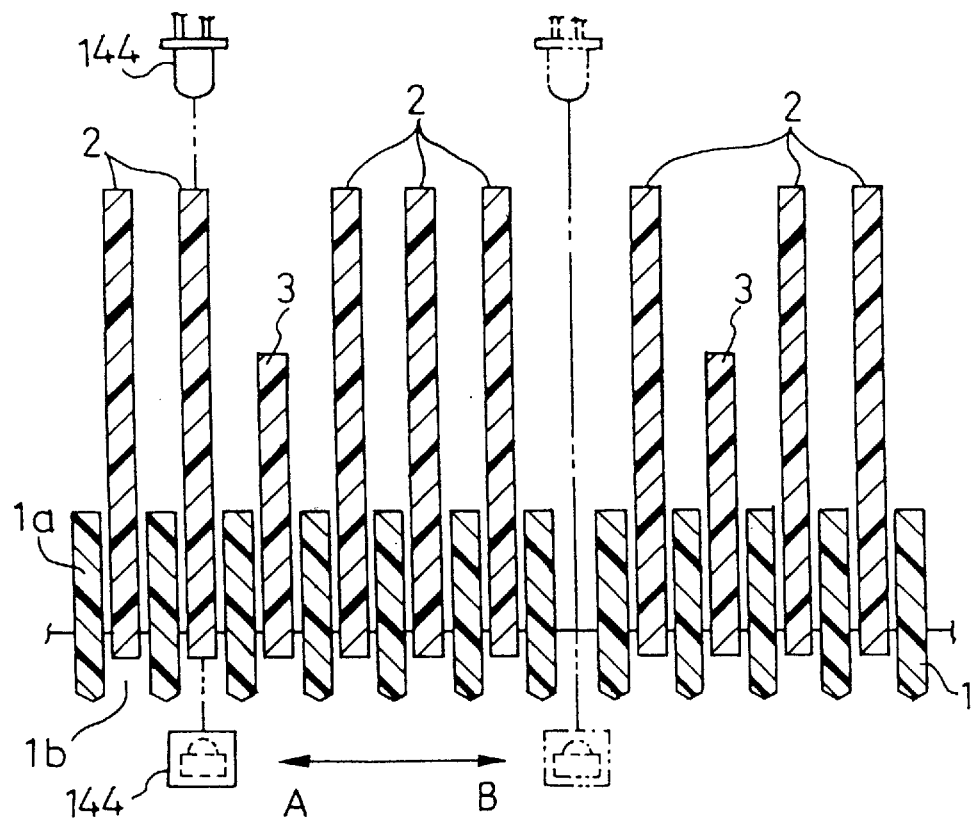
FIG. 18 is a sectional view showing a disk sensor and the like of the loading unit of the disk changer apparatus of the embodiment.

FIG. 18 is a longitudinal sectional view showing an arrangement of the disk sensor 144, the stocker tray 1 and the disks 2, 3. As shown in FIG. 18, the light sensor as the disk sensor 144 of this embodiment is constituted by a light-emitting diode arranged above the disk 2, 3 held in the stocker tray 1 and a photo-detector arranged under the disks 2, 3, thereby to detect the presence or absence of the disks 2, 3 in each stock tray 1.

As shown in FIG. 17, the sensor printed board 142 has mounted thereon a light-emitting device 151 which is arranged in the vicinity of the rear end of the disks 2, 3 held in the stocker tray 1. The light-emitting device 151 is arranged in such a position that the light emitted from it can be confirmed from the transparent window 5*b* of the front door 5, directly or through the disks 2, 3 as shown in FIG. 5. As a result, when the loading unit 100 moves along the direction of arrow A or B, the light from the LED or the like as the light-emitting device 151 can be visually checked from the transparent window 5*b* of the front door 5 through the gaps between the disks 2, 3 and also through the transparent disks 2, 3. The position of the loading unit 100 can thus be easily checked.

The signals produced in the disk playback unit 102 (FIG. 8), the circuits on the motor printed board 136 (FIG. 7) and the circuits on the sensor print board 142 (FIG. 17), are output through the flexible signal wire 14 to the circuit board 15 external to the frame 40 (FIG. 3), after being concentrated on the printed board 125 (FIG. 8).

[Stop Mechanism of Loading Unit 100]

Next, a stop mechanism will be explained when the loading unit 100 returns to the initial state after the transport operation.

As shown in FIG. 6, the first lock gear 146 is in mesh with the gear wheel 131*a* of the first driving gear 131 on the loading unit 100. A shaft 146*a* of the first lock gear 146 inserts to an insertion hole 9*d* of the upper rack plate 9 so that the first lock gear 146 is mounted movably along the direction of arrow a or b. The first lock gear 146 has a rack 146*b* continued with the first rack 9*a* of the upper rack plate 9, a gear wheel 146*c* formed about the shaft 146*a*, and corner teeth 146*d* for connecting the rack 146*b* and the gear wheel 146*c*. A pin 146*e* of the first lock gear 146 is engaged with an arcuate hole 9*e* of the upper rack plate 9 thereby to restrict the rotational range of the first lock gear 146 along the direction of arrow a or b (FIG. 6).

In similar fashion as the above-mentioned first lock gear 146, the second lock gear 147 is in mesh with the gear wheel 133*a* of the second driving gear 133. A shaft 147*a* of the second lock gear 147 inserts to an insertion hole 9*f* of the upper rack plate 9 so as to rotate along the direction of arrow c or d. The second lock gear 147 has a rack 147*b* continued with the second rack 9*b* of the upper rack plate 9, a gear wheel 147*c* formed about the shaft 137*a*, and corner teeth 147*d* for connecting the rack 147*b* and the gear wheel 147*c*. A pin 147*e* of the second lock gear 147 is engaged with an arcuate hole 9*g* of the upper rack plate 9 thereby to restrict the rotational range of the second lock gear 147 along the direction of arrow c or d. (FIG. 6)

The third lock gear 148 is in mesh with a gear wheel 135*a* of the third driving gear 135. A shaft 148*a* of the third lock gear 148 inserts to an insertion hole 10*c* of the lower rack plate 10 so as to rotate along the direction of arrow e or f. The third lock gear 148 has a rack 148*b* continued with the third rack 10*a* of the lower rack plate 10, a gear wheel 148*c* formed about the shaft 148*a* and corner teeth 148*d* for connecting the rack 148*b* and the gear wheel 148*c*. A pin 148*e* of the third lock gear 148 is in mesh with the arcuate hole 10*d* of the lower rack plate 10 thereby to restrict the rotational range of the lower lock gear 148 along the direction of arrow e or f.

Figure 19:
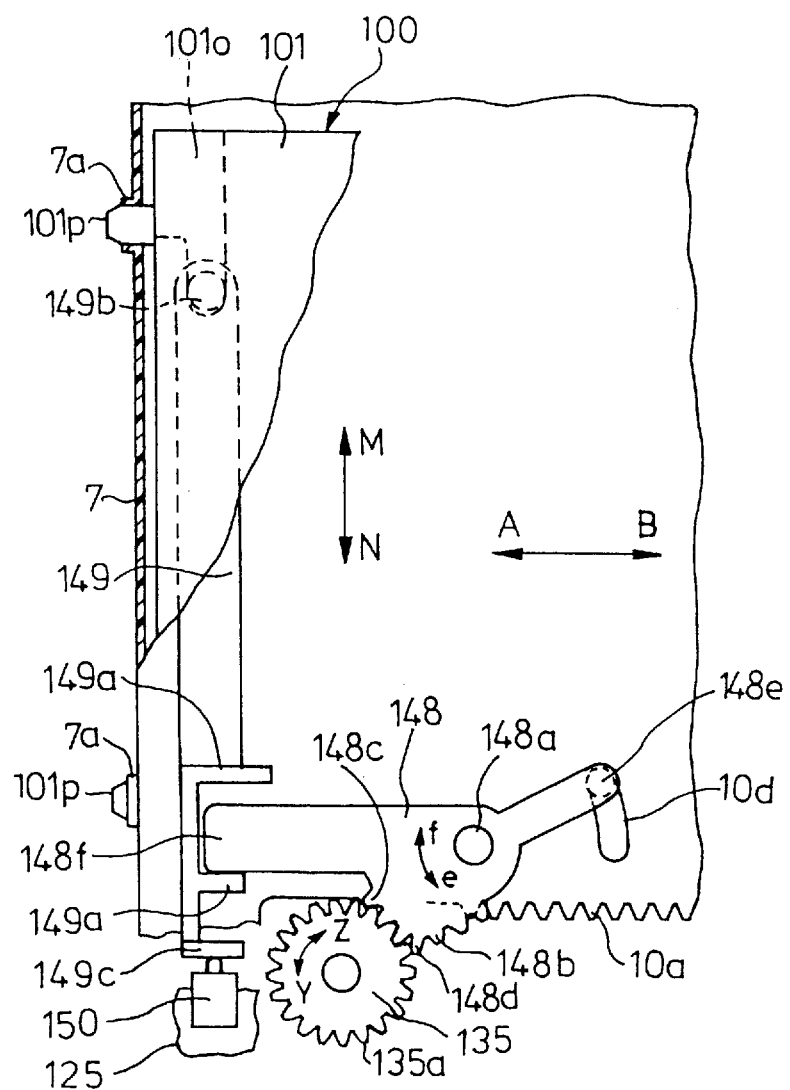
FIG. 19 is a plan view showing a lock mechanism of the loading unit of the disk changer apparatus of the embodiment.
Figure 20:
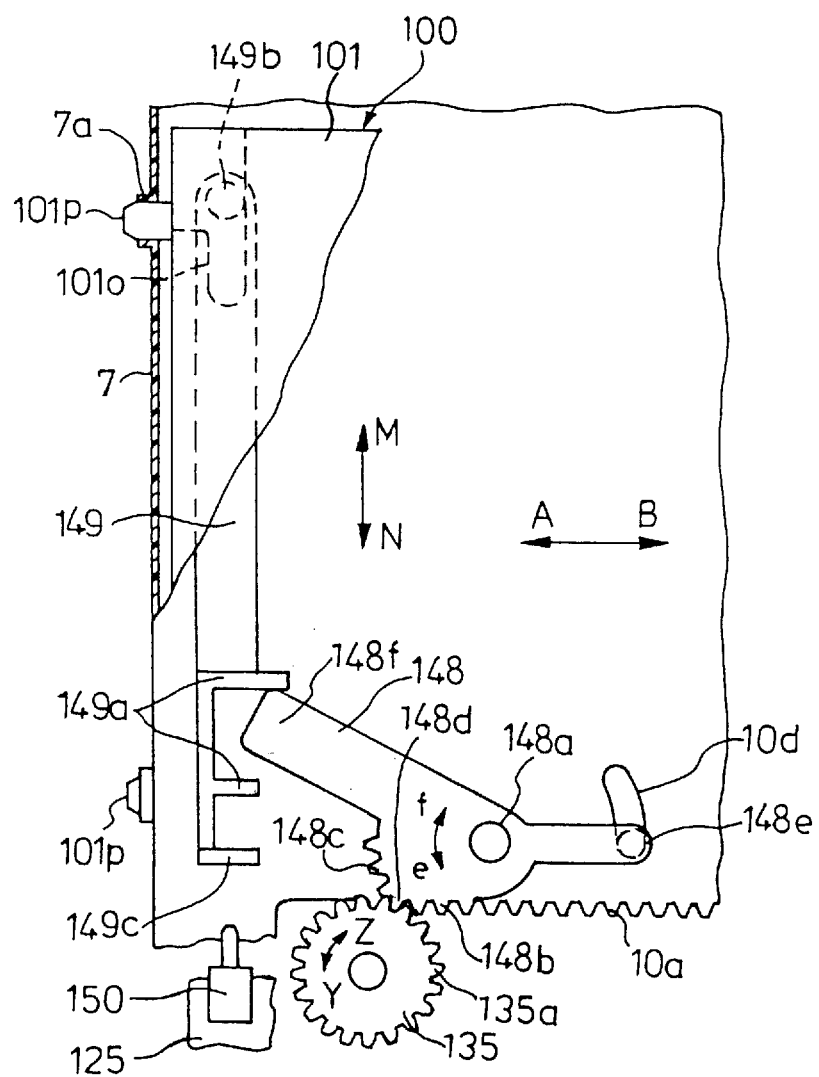
FIG. 20 is a plan view showing the lock mechanism of the loading unit of the disk changer apparatus of the embodiment.

As shown in FIG. 6, a lock shaft 149 mounted on the lower rack plate 10 so as to move along the direction of arrow N or M. FIGS. 19 and 20 are plan views showing an engagement between the third lock gear 148 and the lock shaft 149. FIG. 19 shows an initial state of disk transport operation when the loading unit 100 is positioned at the extreme left position. FIG. 20 shows an unlocked state as the initial operation of the loading unit 100. The guide rib 149*a* of the lock shaft 149 is in mesh with the forward end 148*f* formed on the third lock gear 148. By the rotation of the third lock gear 148 along the direction of arrow e or f, the lock shaft 149 moves along the direction of arrow N or M. A lock pin 149*b* protruded from the rear end of the lock shaft 149 is arranged to be engaged with a guide slot 101*o* formed in the lower surface of the mechanism base 101 when the loading unit 100 is in the initial state of disk transport operation.

In the initial state of the loading unit 100, the four stepped pins 101*p* formed on the left side of the mechanism base 101 are inserted in the guide holes 7*a* formed in the left side plate 7 thereby to prevent vibrations of the loading unit 100. Also, three intervals between the first lock gear 146 and the first driving gear 131, between the second lock gear 147 and the second driving gear 133 and between the third lock gear 148 and the third driving gear 135 are maintained to have the predetermined gear pitches. In the initial state, the first lock gear 146 is in mesh with the first driving gear 131, the second lock gear 147 is in mesh with the second driving gear 133, the third lock gear 148 is in mesh with the third driving gear 135, and the lock shaft 149 is in mesh with the mechanism base 101. The loading unit 100 therefore is locked securely to the upper rack plate 9, the lower rack plate 10 and the left side plate 7.

A switch piece 149*c* is formed at the front end of the lock shaft 149. When the loading unit 100 reaches the initial state, the switch piece 149*c* presses a rest switch 150 (FIG. 8) mounted on the printed board 125 and turns on the rest switch 150. With the turning on of the rest switch 150, the loading unit driving motor 126 is stopped.

[Operation of Disk Changer Apparatus]

The operation will be explained about the disk changer apparatus of this embodiment configured as described above.

[Transport Operation of Loading Unit 100]

In the condition that the front door 5 of the disk changer apparatus of FIG. 2 is opened, the disks 2, 3 are mounted and held in the holding slots 1*b* of the stocker tray 1. In this condition, there is nothing to fall the disk 2, 3 out of the stocker tray 1 even if the disk 2, 3 is pushed into the position deeper than the stocker tray 1 or the disk changer apparatus is tilted. Since the disk 2, 3 come into contact with the screen belt 13 arranged to close the rear side of the stocker tray 1, the disk 2, 3 is prevented from falling out of stocker tray 1. Also, since the rear side of the stocker tray 1 is masked by the wide screen belt 13, the internal mechanism is protected from dust or dirt while at the same time retaining the beautiful appearance of the deep internal parts of the stocker tray 1. After the disks 2, 3 are mounted in the stocker tray 1, the front door 5 of the disk changer apparatus is closed, and the playback operation of the disk changer apparatus is performed by the operating switch 5*c* (FIG. 1) arranged on the front door 5.

When a command is issued to play back the designated disk 2, 3 by manipulating the operating switch 5*c*, the loading unit driving motor 126 shown in FIG. 7 is started. The driving force of the loading unit driving motor 126 is imparted to the first driving gear 131 through a reduction mechanism having a motor pulley 127, a belt 128, a pulley gear 129 and a reduction gear 130. The first driving gear 131 thus rotates in the direction of arrow Y. At the same time, the second driving gear 133 coupled through the intermediate gear 132 is rotated along the direction of arrow Y. As a result, the third driving gear 135 connected to the second driving gear 133 through the coupling rod 134 is rotated along the direction of arrow Y.

In the initial state of the loading unit 100, the first driving gear 131 is in mesh with the gear wheel 146*c* of the first lock gear 146, and the second driving gear 133 is in mesh with the gear wheel 147c of the second lock gear 147, as described above. At the same time, the third driving gear 135 is in mesh with the gear wheel 148c of the third lock gear 148 as shown in FIG. 19. As a consequence, by the rotation of the loading unit driving motor 126, the first lock gear 146 in mesh with the first driving gear 131 rotates in the direction of arrow b (FIG. 6). After rotation of the first lock gear 146 by predetermined degrees, the pin 146e of the first lock gear 146 comes into contact with an end of the arcuate hole 9e of the upper rack plate 9 so that the rotation of the first lock gear 146 along the direction of arrow b is stopped. At this time, the teeth of the rack 146b of the first lock gear 146 are aligned on the same pitch line with the teeth of the first rack 9a of the upper rack plate 9. For this reason, the gear wheel 131a of the first driving gear 131 transfers onto the first rack 9a of the upper rack plate 9 from the rack 146b of the first lock gear 146. At the same time, the second driving gear 133 transfers onto the second rack 9b of the upper rack plate 9 from the second lock gear 147, and the third driving gear 135 onto the third rack 10a of the lower rack plate 10 from the third lock gear 148.

In the initial state of the transport operation of the loading unit 100 shown in FIG. 19, the third driving gear 135 is in mesh with the gear wheel 148c of the third lock gear 148. Also, the forward end 148f of the third lock gear 148 is in mesh with the guide rib 149a of the lock shaft 149. By the rotation of the third driving gear 135, therefore, the third lock gear 148 presses the lock shaft 149 in the direction of arrow M and thus unlocks the loading unit 100 shown in FIG. 20. At the same time, the lock pin 149b of the lock shaft 149 has come off the guide slot 101o formed in the mechanism base 101. The loading unit 100 thus is in a movable state.

As described above, after becoming the movable state, the loading unit 100 retaining a vertical position starts to move rightward of the disk changer apparatus (along the direction of arrow B in FIG. 20) by the rotation of the first driving gear 131, the second driving gear 133 and the third driving gear 135. In the above-mentioned condition, the screen belt 13 rotates around the loading unit 100 by sliding on the screen rollers 145 arranged at the four corners of the loading unit 100.

When the loading unit 100 moves and the position sensor 143 for detecting the sensor rib 1d of the stocker tray 1 comes to detect the holding position of the designated disk 2, 3, the movement of the loading unit 100 along the direction of arrow B is stopped. At the same time, the count sensor 137 (FIG. 7) mounted on the printed board 136 detects the rotational speed of the count ring 129a fixed to the same shaft as the pulley gear 129, thereby increasing the accuracy of the stop position of the loading unit 100.

Even if the disk changer apparatus is tilted or shocked, all of the held disks other than the designated disk 2, 3 are in contact with the front of the mechanism base 101 or the screen belt 13 and thus are prevented from advancing into the disk changer apparatus.

[Transport Operation of Loading Unit 100 for Large Disk 2]

When the loading unit 100 reaches the position of the stocker tray holding the designated disk 2, 3, the transport operation of the loading unit 100 is performed to supply the designated disk 2, 3 to the disk playback unit 102.

The explanation below refers to the case in which the large disk 2 is designated.

FIG. 21 is a side view showing the internal mechanism with the loading unit 100 having reached the designated position of the stocker tray 1. In the initial state of the transport operation shown in FIG. 21, the driving force of the slide plate driving motor 116 is imparted to the main driving gear 122 through the reduction mechanism including the motor pulley 117, the belt 118, the pulley gear 119, the first reduction gear 120 and the second reduction gear 121, thereby rotating the main driving gear 122 in the direction of arrow X. The gear wheel 122a of the main driving gear 122 is in mesh with the rack 103g of the lower slide plate 103, and therefore the lower slide plate 103 moves in the direction of arrow E. As a result, the upper slide plate 104 coupled through the connecting lever 105 is moved along the direction of arrow G.

In FIG. 21 when the lower slide plate 103 moves in the direction of arrow E, the driving pin 108d of the feed assisting lever unit 108 comes into contact with the inclined cam 103c of the lower slide plate 103. As a result, the feed assisting lever unit 108 is rotated in the direction of arrow P (FIG. 13). The positioning rib 108c of the feed assisting lever unit 108 advances into the holding slot 1b of the stocker tray 1 adjacent to the designated stocker tray 1, and performs the positioning for the designated disk. At the same time, the gear wheel 108b of the feed assisting lever unit 108 is in mesh with the gear wheel 107d of the forward feed lever unit 107. The lever unit 107 thus rotates along the direction of arrow K.

Figure 22:
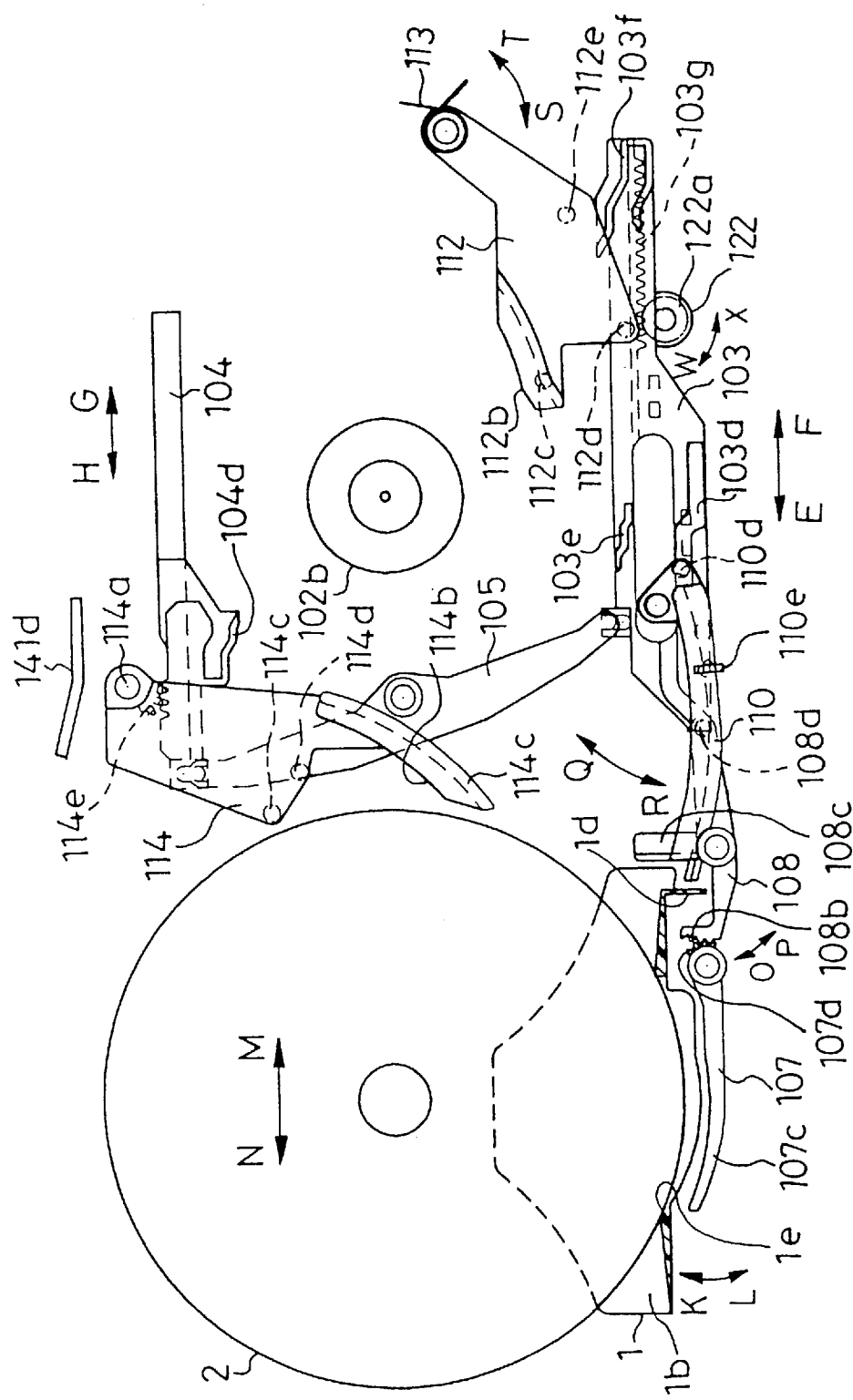
FIG. 22 is a side view showing the loading unit and the like of the disk changer apparatus of the embodiment in the process for transporting a large disk.

FIGS. 22 to 26 are diagrams for explaining the transport operation of the internal mechanism. FIG. 22 is a side view showing a part of the internal mechanism in the initial state of the transport operation.

As shown in FIG. 22, the lever 107c of the forward feed lever unit 107 advances from under the holding slot 1b of the designated stocker tray 1, and the lever unit 107 rotates along the direction of arrow K. The large disk 2 held in the holding slot 1b thus rolls along the direction of arrow M thereby transferring into the state shown in FIG. 23.

Figure 23:
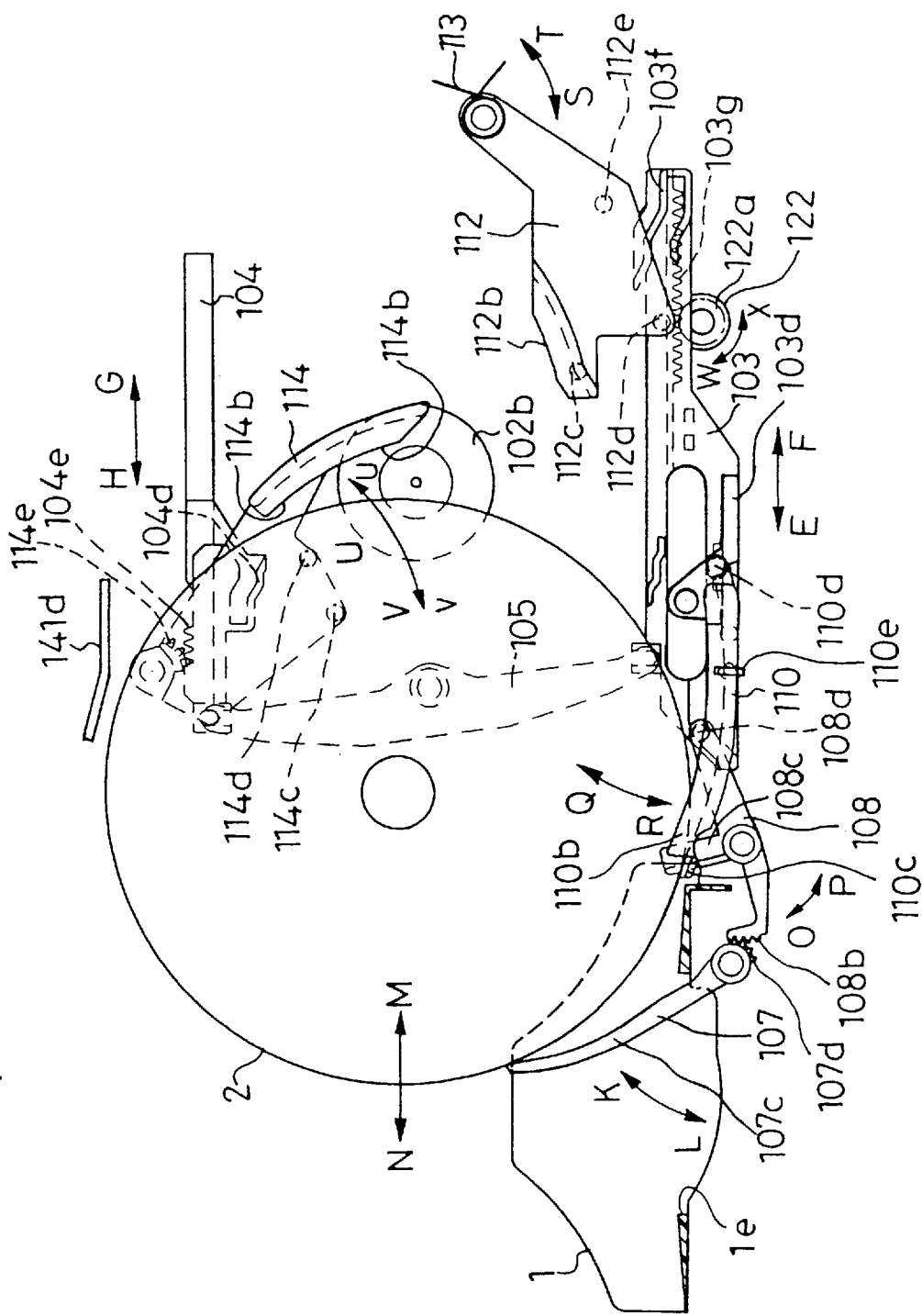
FIG. 23 is a side view showing the loading unit and the like of the disk changer apparatus of the embodiment in the process for transporting a large disk.

In the state shown in FIG. 23, the large disk 2 moves onto the V-shaped groove 110b of the rearward feed lever unit 110. In this transport operation, the gear wheel 114e of the return lever unit 114 is rotated along the direction of arrow U by the movement of the rack 104e of the upper slide plate 104. As a result, the return lever unit 114 is disposed at a position where the movement of the large disk 2 is not obstructed.

Further, the lower slide plate 103 moves along the direction of arrow E. Since the driving pin 108d of the feed assisting lever unit 108 is contacted with a flat position of the inclined cam 103c, the feed assisting lever unit 108 and the forward feed lever unit 107 retain the position shown in FIG. 23.

The driving pin 110d of the rearward feed lever unit 110 in mesh with the driving cam 103d of the lower slide plate 103 moves within the driving cam 103d by the movement of the lower slide plate 103 along the direction of arrow E. The rearward feed lever unit 110 thus rotates along the direction of arrow Q, so that the large disk 2 moves further along the direction of arrow M into the position shown in FIG. 24.

Figure 24:
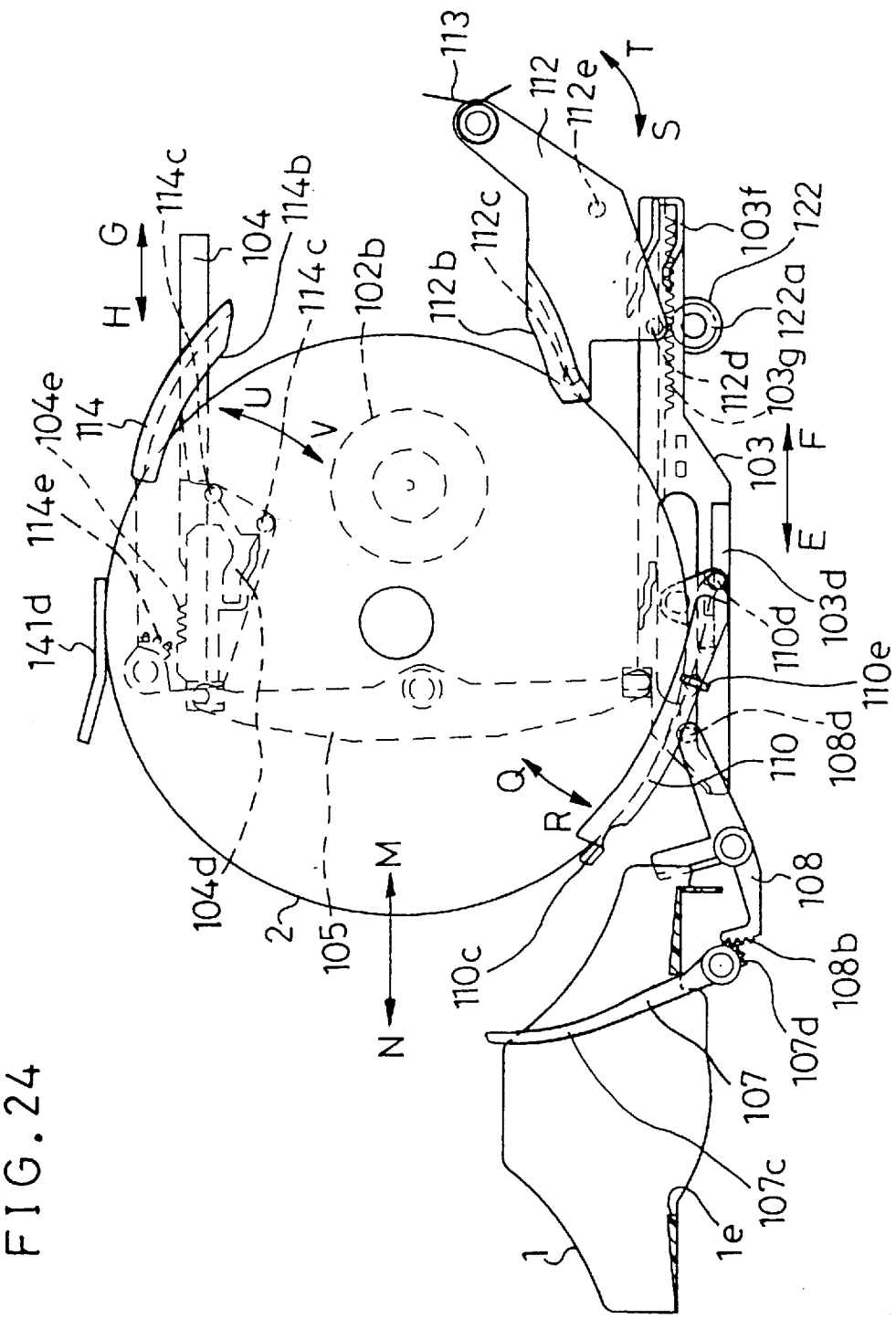
FIG. 24 is a side view showing the loading unit and the like of the disk changer apparatus of the embodiment in the process for transporting a large disk.

In the state shown in FIG. 24, the outer rear end of the large disk 2 and the forward end of the V-shaped groove 112b of the size detection lever 112 begins to contact each other. Further, the rearward feed lever unit 110 presses the large disk 2 by rotating along the direction of arrow Q. In this operation, the upward movement of the upper end of the large disk 2 is restricted by contacting with the guide rib 141d of the right disk guide 141. Therefore, the large disk 2 moves along the direction of M by the rearward feed lever 110 which rotates along the direction of arrow Q. Although the size detection lever 112 is urged along the direction of arrow S by the spring 113, the force of the rearward feed lever 110 for pressing the large disk 2 is larger than the driving force of the spring 113. As a result, the size detection lever 112 rotates in the direction of arrow T (FIG. 25) by the driving force of the rearward feed lever 110.

Figure 25:
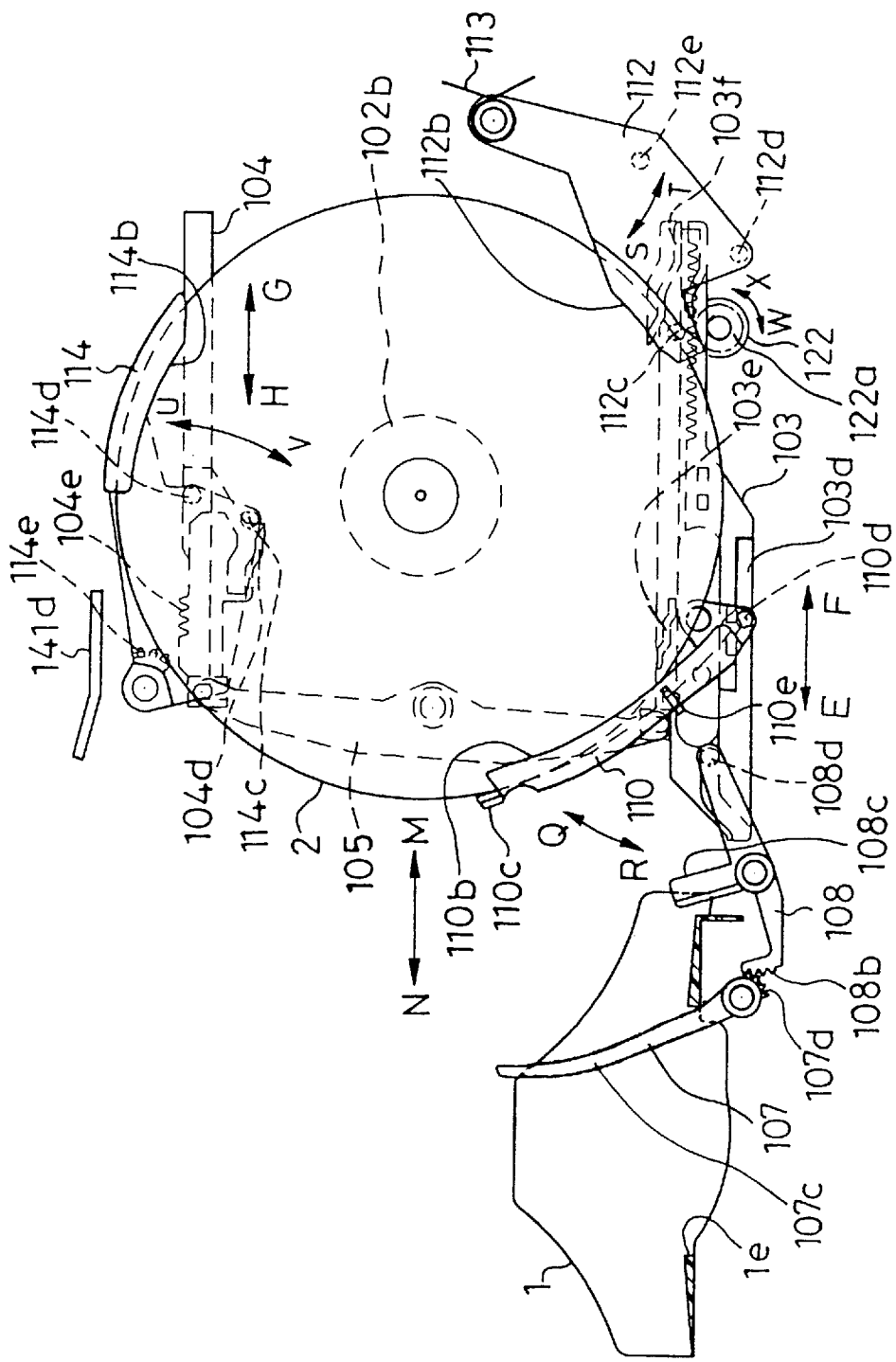
FIG. 25 is a side view showing the loading unit and the like of the disk changer apparatus of the embodiment in the process for transporting a large disk.

When the rotation of the size detection lever unit 112 along the direction of arrow T as shown in FIG. 25, the large guide pin 112c of the size detection lever unit 112 engages the branch cam slit 103f of the lower slide plate 103. As a result, the lower slide plate 103 moves in the direction of arrow E, so that the size detection lever unit 112 holds the large disk 2 in such a manner that the center of the turn table 102b of the disk playback unit 102 coincides with the center of the large disk 2.

On the other hand, the gear wheel 114e of the return lever unit 114 driven by the rack 104e of the upper slide plate 104 rotates along the direction of arrow U. As a consequence, the return lever unit 114 assumes the position as shown in FIG. 24. After that, the movement of the rearward feed lever unit 110 along the direction of arrow Q moves the large disk 2 along the direction of arrow M, so that the V-shaped groove 114b of the return lever unit 114 comes into contact with the contour of the large disk 2. The return lever unit 114 further rotates along the direction of arrow U against the driving force of the spring 115 (FIG. 13) in the direction of arrow V.

Consequently, the large guide pin 114c formed on the return lever unit 114 is engaged with the branch cam slit 104d of the upper slide plate 104, and the return lever unit 114 holds the large disk 2 at a position where the center of the turn table 102b of the disk playback unit 102 coincides with the center of the large disk 2 (FIG. 25).

On the other hand, when the rearward feed lever unit 110 reaches the position shown in FIG. 25, the driving pin 110d of the rearward feed lever unit 110 disengages from the driving cam 103d of the lower slide plate 103. As a result, the rearward feed lever unit 110 urges the large disk 2 further along the direction of arrow Q by the spring 11 (FIG. 13). The large disk 2 thus is positively held at the position shown in FIG. 25 where the center of the turn table 102b of the disk playback unit 102 coincides with the center of the large disk 2. At this time, the large disk 2 is held in contact with the V-shaped groove 110b of the rearward feed lever unit 110, the V-shaped groove 112b of the size detection lever unit 112 and the V-shaped groove 114b of the return lever unit 114 (FIG. 16A).

The lower slide plate 103 moves further along the direction of arrow E from the position shown in FIG. 25, so that the upper slide plate 104 connected through the connecting lever 105 moves along the direction of arrow G. In this operation, the pin 102a of the disk playback unit 102 is in mesh with the cam slit 103a of the lower slide plate 103 and the cam slit 104a of the upper slide plate 104. As a result, the disk playback unit 102 moves along the direction of arrow C from the playback wait mode position shown in FIGS. 9 and 10 into the playback mode. At the same time, the lift cam slit 104c of the upper slide plate 104 shown in FIG. 9 is in mesh with the pin 106b of the clamp plate 106 (FIG. 8). The movement of the upper slide plate 104 along the direction of arrow G causes the clamp plate 106 to rotate along the direction of arrow I.

As a result, as shown in FIGS. 11 and 12, the large disk 2 is supported between the turn table 102b of the disk playback unit 102 and the damper 106d rotatably mounted in the hole 106c of the clamp plate 106. When the large disk 2 is mounted on the disk playback unit 102, as shown in FIG. 25, the large disk 2 is held by the rearward feed lever unit 110, the size detection lever unit 112 and the return lever unit 114.

After the state shown in FIG. 25, the lower slide plate 103 further moves along the direction of arrow E, and the upper slide plate 104 connected by the connecting lever 105 moves along the direction of arrow G. In this operation, the large guide pin 110e of the rearward feed lever unit 110 is engaged with the guide cam 103e of the lower slide plate 103, and therefore the rearward feed lever unit 110 rotates somewhat along the direction of arrow R, that is, in the reverse direction. Also, the large guide pin 112c of the size detection lever unit 112 is in mesh with the branch cam slit 103f of the lower slide plate 103, so that the size detection lever unit 112 rotates somewhat in the direction of arrow T, that is, in the reverse direction. At the same time, the return lever unit 114, which has the large guide pin 114c in mesh with the branch cam slit 104d of the upper slide plate 104, rotates somewhat along the direction of arrow U.

Figure 26:
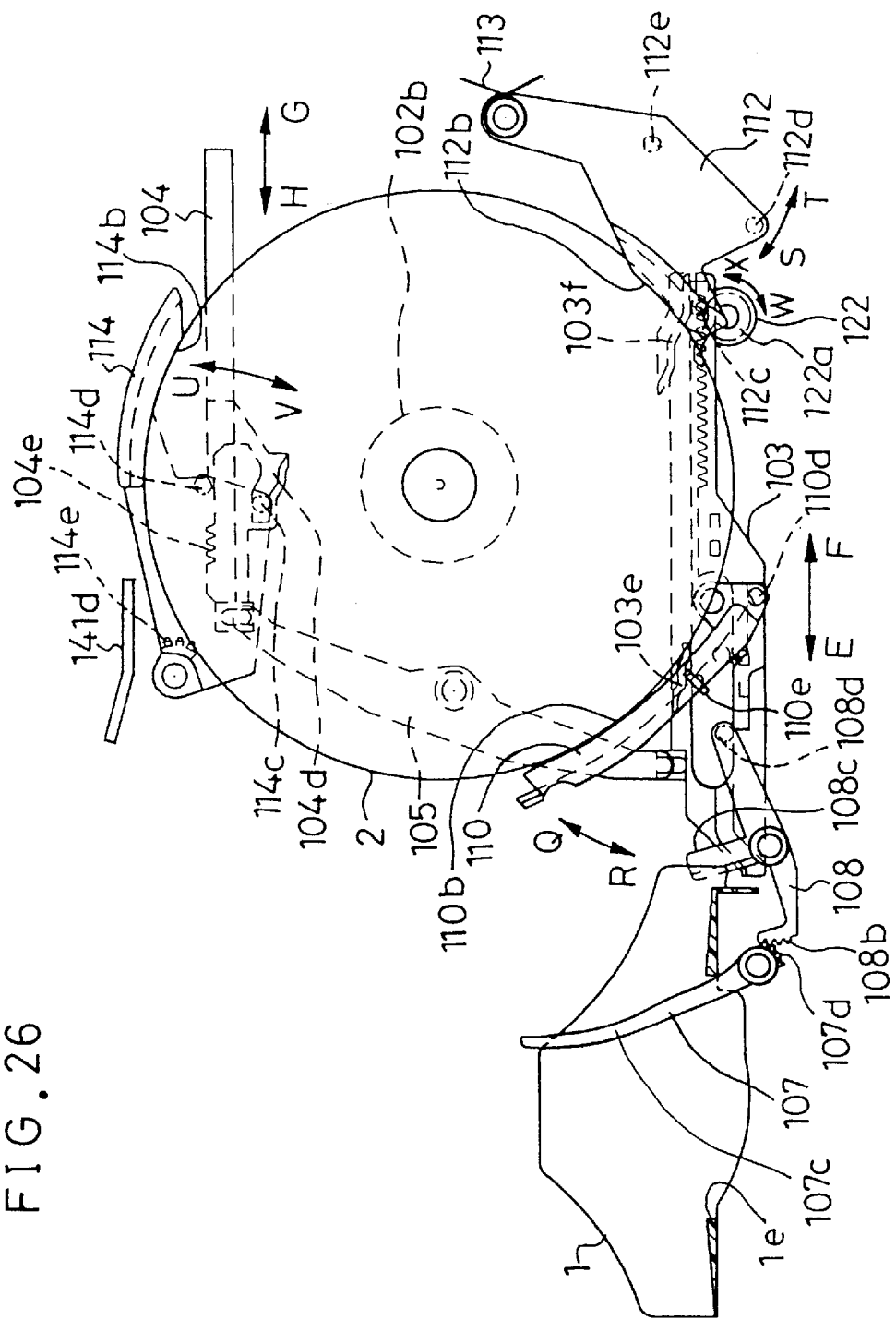
FIG. 26 is a side view showing the loading unit and the like of the disk changer apparatus of the embodiment after completing the operation of transporting a large disk.

As a result, the above-mentioned transport operation is finished as shown in FIG. 26. In the complete termination of the transport operation, the large disk 2 disengage from the V-shaped grooves 110b, 112b and 114b of the rearward feed lever unit 110, the size detection lever unit 112 and the return lever unit 114, so that the large disk 2 enters a free state (FIG. 16B). As a consequence, the large disk 2 is held between the turn table 102b of the disk playback unit 102 and the damper 106d in a rotatable playback position.

In this playback mode, as shown in FIG. 12, the clamp switch 124 is pressed by the second projection 103i of the lower slide plate 103 and turns on. The power supply to the slide plate driving motor 116 is stopped, and the rotation of the slide plate driving motor 116 stops. Consequently, the transport operation of the loading unit 100 is completed and the playback of the large disk 2 is started.

[Return Operation of Loading Unit 100 for Large Disk 2]

When the playback operation for the large disk 2 is finished, the slide plate driving motor 116 shown in FIG. 8 rotates in the direction opposite to the transport operation in order to return the large disk 2 into a predetermined position in the stocker tray 1. As a result, the main drive gear 122 rotates along the direction of arrow W, and drives the lower slide plate 103 along the direction of arrow F. Also, the upper slide plate 104 connected through the coupling lever 105 to the lower slide plate 103 moves along the direction of arrow H. In the state shown in FIG. 25, conversely to the final transport operation described above, the rearward feed lever unit 110 moves along the direction of arrow Q, the size detection lever unit 112 along the direction of arrow S and the return lever unit 114 along the direction of arrow V to some degree. Consequently, the large disk 2 is held in the V-shaped grooves 110b, 112b, 114b as shown in FIG. 25. At the same time, the disk playback unit 102 moves away from the large disk 2 (along the direction of arrow D in FIGS. 11 and 12), and the clamp plate 106 moves along the direction of arrow J, so that the large disk 2 is released from the position held between the turn table 102b and the clamp plate 106.

Further, the lower slide plate 103 shown in FIG. 25 moves along the direction of arrow F. Therefore, the upper slide plate 104 connected through the coupling lever 105 moves in the direction of arrow H. As a result, the driving pin 110d of the rearward feed lever unit 110 slides within the drive cam 103d of the lower slide plate 103, so that the rearward feed lever unit 110 is driven along the direction of arrow R.

The large guide pin 112c of the size detection lever unit 112 in playback mode, which is in mesh with the branch cam slit 103f of the lower slide plate 103, is released from the engagement after the lower slide plate 103 slides a predetermined distance. The size detection lever unit 112 thus is rotated by the spring 113 along the direction of arrow S. Also, the large guide pin 114c of the return lever unit 114 in playback mode, which is in mesh with the branch cam slit 104d of the upper slide plate 104, disengages after the upper slide plate 104 slides a predetermined distance. The return lever unit 114 thus is rotated by the spring 115 along the direction of arrow V. As a result, the large disk 2 is driven by the V-shaped groove 114b of the return lever unit 114 along the direction of arrow N into the position shown in FIG. 24.

The size detection lever unit 112 that has moved along the direction of arrow S comes to stop as the contact pin 112e shown in FIG. 13 comes into contact with the restriction rib 101m of the mechanism base 101.

In the state shown in FIG. 24, the drive pin 110d of the rearward feed lever unit 110 slides within the drive cam 103d of the lower slide plate 103. As a result, the rearward feed lever unit 110 is driven along the direction of arrow R.

On the other hand, the gear wheel 114e of the return lever unit 114 is in mesh with the rack 104e of the upper slide plate 104, so that the return lever unit 114 is driven along the direction of arrow V. As a result, the large disk 2 is pressed by the V-shaped groove 114b of the lever unit 114 further along the direction of arrow N into the position shown in FIG. 23. In this return operation, the large disk 2 is guided into a designated holding slot 1b of the stocker tray 1. With the rotation of the rearward feed lever unit 110 along the direction of arrow R, the guide 110c formed at the forward end of the rearward feed lever unit 110 is arranged into position between the rear end ribs 1c in the holding slot 1b of the stocker tray 1. And, the large disk 2 advances into and is held in the holding slot 1b of the stocker tray 1. The above-mentioned configuration prevents the large disk 2 from colliding the partitioning walls 1a of the stocker tray 1 so that the large disk 2 is returned accurately to the designated holding slot 1b of the predetermined stocker tray 1.

Then, in the state shown in FIG. 23, the engaging surface of the drive cam 103d of the lower slide plate 103 in mesh with the drive pin 110d of the rearward feed lever unit 110 becomes flat, and therefore the rotation of the rearward feed lever unit 110 along the direction of arrow R stops. At the same time, the guide 110c at the forward end of the rearward feed lever unit 110 comes off from the rear end rib 1c of the stocker tray 1 and is arranged under the stocker tray 1.

On the other hand, the return lever unit 114, which has the gear wheel 114e in mesh with the rack 104e of the upper slide plate 104, rotates along the direction of arrow V. Also, the drive pin 108d of the feed assisting lever unit 108 slides over the inclined cam 103c of the lower slide plate 103, and thereby causes the feed assisting lever unit 108 to rotate along the direction of arrow O. Consequently, the forward feed lever unit 107 rotates along the direction of arrow L so that the large disk 2 moves along the direction of arrow N into the designated holding slot 1b of the stocker tray 1 by the pressure of the return lever unit 114.

The above-mentioned return operation causes the large disk 2 to be held in the stocker tray 1 and restores the initial state of the transport operation shown in FIGS. 22 and 10. At the same time, as shown in FIG. 10, the free switch 123 turns on under the pressure exerted by the first projection 103h of the lower slide plate 103. Therefore, the slide plate driving motor 116 is stopped, thereby completing the return operation for returning the large disk 2 into the stocker tray 1.

[Transport Operation of Loading Unit 100 for Small Disk 2]

Next, explanation will be made about the playback operation for the case where the small disk 3 is designated.

In the initial state of transport operation shown in FIG. 21, the slide plate driving motor 116 is rotated and the lower slide plate 103 is driven in the direction of arrow E by the main drive gear 122 through the reduction mechanism in order to supply the designated small disk 3 to the disk playback unit 102. Also, the upper slide plate 104 connected to the lower slide plate 103 through the coupling lever 105 moves along the direction of arrow G.

Figure 27:
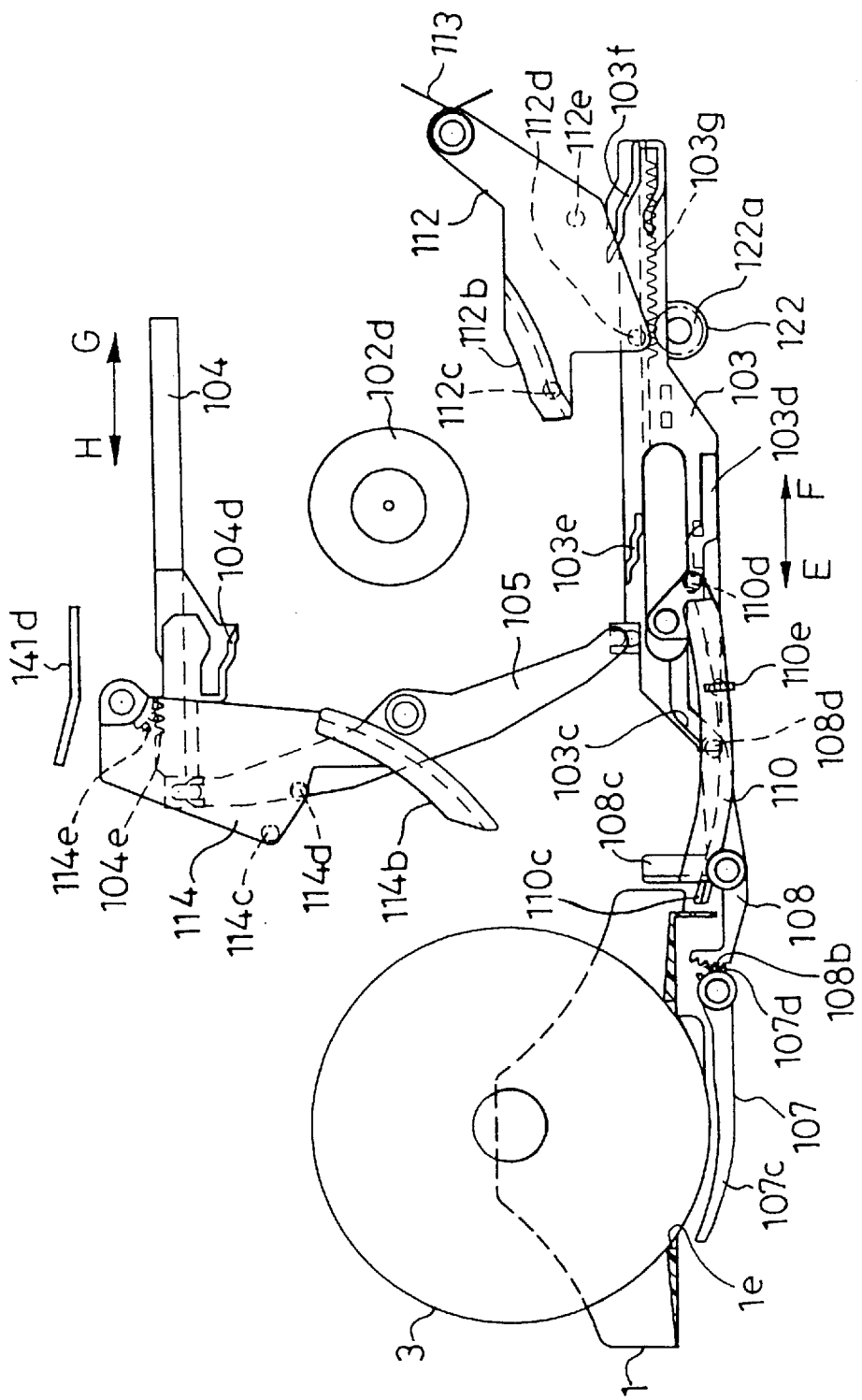
FIG. 27 is a side view showing the loading unit and the like of the disk changer apparatus of the embodiment in the initial state of the operation for transporting a small disk.

FIGS. 27 to 31 show the operation for transporting the small disk 3. FIG. 27 is a side view showing a part of the internal mechanism in the initial state of transport operation.

Figure 28:
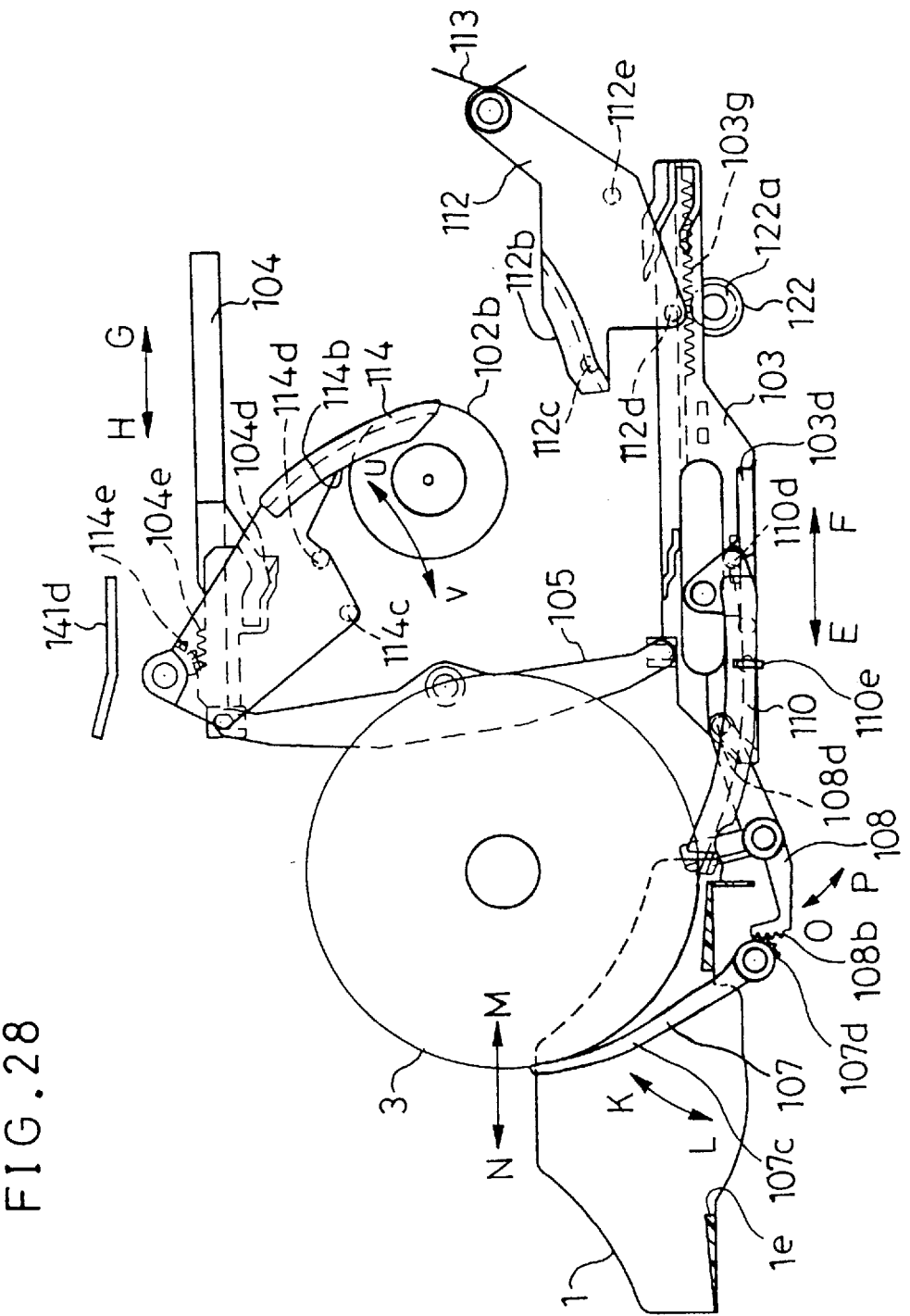
FIG. 28 is a side view showing the loading unit and the like of the disk changer apparatus of the embodiment in the process for transporting a small disk.
Figure 29:
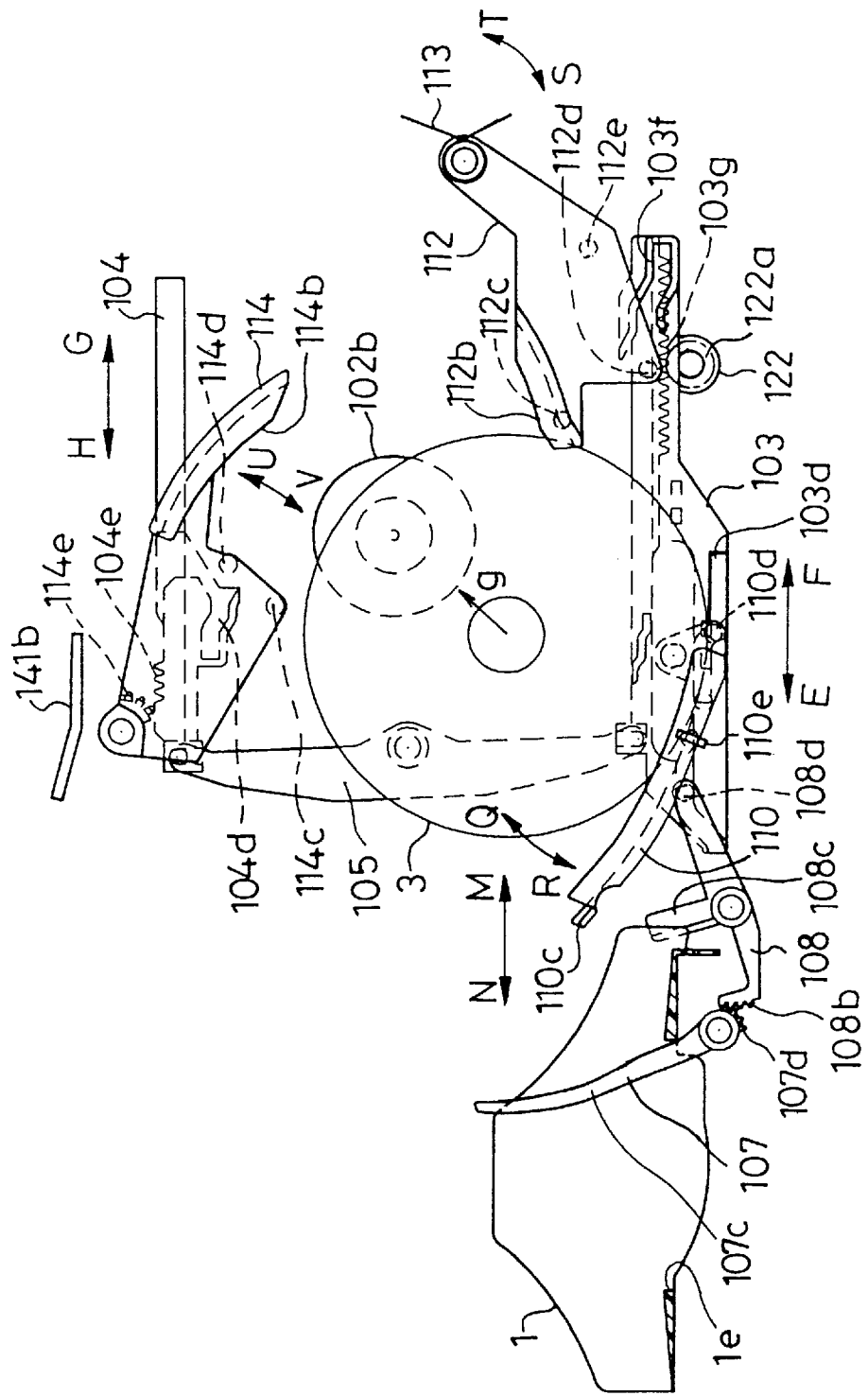
FIG. 29 is a side view showing the loading unit and the like of the disk changer apparatus of the embodiment in the process for transporting a small disk.

In the transport operation of the small disk 3, the states shown in FIGS. 27 to 29 are identical to those shown in FIGS. 22 to 24 in the transport operation of the large disk 2, and therefore will not be described any further.

In the state shown in FIG. 29, the contour of the small disk 3 begins to come into contact with the forward end of the V-shaped groove 112b of the size detection lever unit 112. Also, the movement of the lower slide plate 103 along the direction of arrow E causes the rearward feed lever unit 110 to rotate along the direction of arrow Q. The small disk 3 is prevented from falling laterally by the left disk guide 140 and the right disk guide 141. (FIG. 17) The small disk 3 is so small in contour, however, fails to contact the guide rib 141d formed above the right disk guide 141. Therefore, a gap is retained above the small disk 3. The small disk 3 thus is movable upward.

In the state of FIG. 29, the size detection lever unit 112 which is urged along the direction of arrow S by the spring 113 is stopped at the position shown in FIG. 29. Therefore, the small disk 3 is lifted upward (along the direction of arrow g in FIG. 29), by the rotation of the rearward feed lever unit 110 along the direction of arrow Q.

Figure 30:
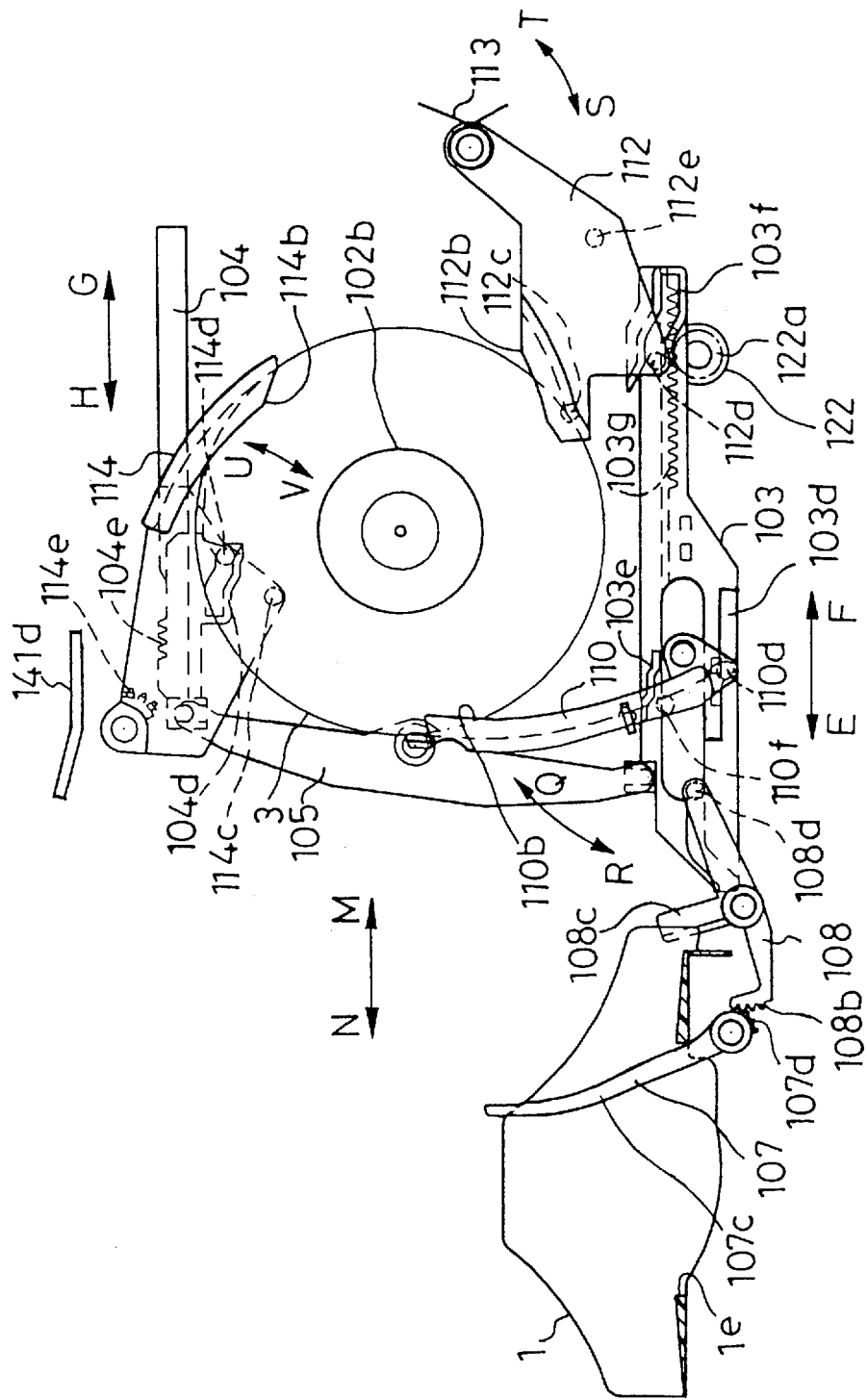
FIG. 30 is a side view showing the loading unit and the like of the disk changer apparatus of the embodiment in the process for transporting a small disk.

At the same time, the small guide pin 112d of the size detection lever unit 11 2 is engaged with the branch cam slit 103f of the lower slide plate 103, and the size detection lever unit 112 guides the small disk 2 into the position shown in FIG. 30 so that the center of the small disk 3 coincides with that of the turn table 102b of the disk playback unit 102.

The return lever unit 114, on the other hand, rotates along the direction of arrow U in such a manner as to transport the large disk 2 up to the position shown in FIG. 29. Since the small disk 3 is designated, however, the force resisting the urge of spring 115 is not exerted on the return lever unit 114. Therefore, the return lever unit 114 is held at the position shown in FIG. 29. As a result, as shown in FIG. 30, the small guide pin 114d of the return lever unit 114 is engaged with the branch cam slit 104d of the upper slide plate 104. And the small disk 3 is guided so that the center of the small disk 3 coincides with the center of the turn table 102b of the disk playback unit 102.

In the state shown in FIG. 30, the drive pin 110d of the rearward feed lever unit 110 comes off from the drive cam 103d of the lower slide plate 103 in such a manner as to transport the large disk 2, thereby completing the driving operation by the drive cam 103d. Nevertheless, the rearward feed lever unit 110, which is kept to be urged along the direction of arrow Q by the spring 111, rotates along the direction of arrow Q. Consequently, in the case that the small disk 3 is designated, the rearward feed lever unit 110 rotates along the direction of arrow Q over a longer distance because the diameter of the small disk 3 is smaller than that of the large disk 2. As a result, the small disk 3 is positively guided into and held in playback mode where the center of the turn table 102b of the disk playback unit 102 coincides with the center of the small disk 3. In this transport operation, the outer periphery of the small disk 3 is held in contact with the V-shaped groove 110b of the rearward feed lever unit 110, the V-shaped groove 112b of the size detection lever unit 112 and the V-shaped groove 114b of the return lever unit 114 (FIG. 16A).

Next, the movement of the lower slide plate 103 and the upper slide plate 104 causes the disk playback unit 102 to move along the direction of arrow C from the playback wait mode shown in FIGS. 9 and 10, in such a manner as to transport the large disk 2 described above. At the same time, the clamp plate 106 rotates along the direction of arrow I. As a consequence, the small disk 3 is supported between the turn table 102b of the disk playback unit 102 and the damper 106d of the clamp plate 106, and is into the playback mode shown in FIGS. 11 and 12.

In the state shown in FIG. 30, the lower slide plate 103 further moves along the direction of arrow E, and the upper slide plate 104 connected to the lower slide plate 103 through the coupling lever 105 moves along the direction of arrow G. As a result, the small guide pin 110f of the rearward feed lever unit 110 comes to engage the guide cam 103e of the lower slide plate 103. Consequently, the rearward feed lever unit 110 rotates somewhat along the direction of arrow R.

Also, the small guide pin 112d of the size detection lever unit 112 is engaged with the branch cam slit 103f of the lower slide plate 103. Therefore, the size detection lever unit 112 somewhat rotates along the direction of arrow T. At the same time, the return lever unit 114 somewhat rotates along the direction of arrow U since the small guide pin 114d of the return lever unit 114 engages the branch cam slit 104d of the upper slide plate 104. In this operation, the rearward feed lever unit 110, the size detection lever unit 112 and the return lever unit 114 come off from the outer periphery of the small disk 3, so that the small disk 3 is rotatably supported in playback mode between the turn table 102b of the disk playback unit 102 and the clamper 106d.

In the playback mode shown in FIG. 12, the clamp switch 124 is pressed to be into on state by the second projection 103i of the lower slide plate 103, and the slide plate driving motor 116 is stopped. As a result, the transport operation for loading the small disk 3 to the disk playback unit 102 is completed, and the playback of the small disk 3 is started.

[Return Operation of Loading Unit 100 for Small Disk 3]

When the playback of the small disk 3 is finished, the slide plate driving motor 116 is started to return the small disk 3 to a predetermined position in the stocker tray 1. As a result, the rearward feed lever unit 110 rotates somewhat along the direction of arrow Q in such a manner as to return the large disk 2 described above. And, the size detection lever unit 112 somewhat along the direction of arrow S and the return lever unit 114 somewhat along the direction of arrow V, so that the small disk 3 is held by the V-shaped grooves 110b, 112b and 114b of the respective levers. The above-mentioned condition is shown in FIG. 30. After the condition shown in FIG. 30, the disk playback unit 102 moves away from the small disk 3 (along the direction of arrow D in FIGS. 11 and 12), and the clamp plate 106 rotates away from the small disk 3 (along the direction of arrow J in FIGS. 11 and 12).

In FIG. 30, the lower slide plate 103 further moves along the direction of arrow F, and the upper slide plate 104 connected to the lower slide plate 103 through the coupling lever 105 moves along the direction of arrow H. In this operation, the size detection lever unit 112 is urged along the direction of arrow S by the spring 113 and is held at the position shown in FIG. 30. The rearward feed lever unit 110 and the return lever unit 114 rotate in such a manner as to return the large disk 2 described above. And, the disk changer apparatus restores the initial state of transport operation shown in FIGS. 9, 10 and 27 through the states shown in FIGS. 29 and 28. In this operation, as shown in FIG. 10, the free switch 123 is pressed to be on state by the first projection 103h of the lower slide plate 103. Consequently, the rotation of the slide plate driving motor 116 is stopped thereby to complete the operation of returning the small disk 3 to the stocker tray 1.

Next, in the case of playing back other disks 2, 3, a playback command is issued by manipulating the operating switch 5c provided on the front door 5, and the loading unit driving motor 126 is started thereby to drive the loading unit 100 rightward of the disk changer apparatus (along the direction of arrow B in FIG. 4) like the aforementioned transport operation of the loading unit 100.

After the loading unit 100 stops at the position of the stock tray 1 holding the designated disk 2, 3, the slide plate driving motor 116 rotates to start the transport operation for supplying the designated disk 2, 3 in the stocker tray 1 to the disk playback unit 102.

Upon complete playback of the designated disk 2, 3, the disk 2, 3 is returned to a predetermined stocker tray 1 by the return operation. The disks 2, 3 held in the stocker tray 1 are thus sequentially and continually played back by repeating the transport and return operations described above.

As shown in FIGS. 18 and 21, in the transport operation of the loading unit 100 moving laterally of the disk changer apparatus (along the direction of arrow A or B in FIG. 18), the disk sensor 144 on the loading unit 100 traverses the stocker array 1 and detects the presence or absence of the disks 2, 3 held in the stocker tray 1. According to this embodiment, the disk sensor 144 is a light sensor and is configured of a light-emitting device and a photo-detector. If the disks 2, 3 are held in the stocker tray 1, the signal from the light-emitting device of the disk sensor 144 is cut off. If the disks 2, 3 are not held in the stocker tray 1, on the other hand, the signal of the light-emitting device reaches the photo-detector. As a result, the presence or absence of the disks 2, 3 in the stocker tray 1 can be positively detected by the disk sensor 144. In the case that the disks 2, 3 held in the stocker tray 1 are played back sequentially and continually, when a position where the disks 2, 3 are not held in the stocker tray 1 is detected during the transport operation of the loading unit 100, the transport operation can be conducted to pass to the next disk 2, 3 directly. The disk changer apparatus of this embodiment, therefore, is capable of high-speed disk change.

Also, in an initial state (e.g. at the instant following power-on) if the loading unit 100 is constructed to reciprocate along the right and left directions in order to detect the disk holding condition in the stocker tray 1, and store the disk holding condition how the disks 2, 3 of stocker tray 1 are held, the disk changer apparatus of this embodiment is capable of even higher-speed disk change. Further, the conditions of the disks 2, 3 held in the stocker tray 1 can be displayed collectively by the disk changer apparatus of this embodiment, thereby providing an even more convenient apparatus to the user.

The disk sensor 144 of this embodiment is for accurately detecting the disks 2, 3 held in each stocker tray 1 in the time of moving the loading unit 100 along the direction of arrow A or B. The disk changer apparatus of this embodiment is configured to detect the disks 2, 3 held in the stocker tray 1 by using the data of the disk sensor 144 and the position sensor 143 which detects the position of the loading unit 100 by detecting the sensor rib 1d of each stocker tray 1. Also, the disk changer apparatus of this embodiment is capable of detecting the position of the disks 2, 3 with higher accuracy using the data from the count sensor 137.

After complete playback operation of the desired disks 2, 3, a command is issued from the operating switch 5c for restoring the disk changer apparatus to the initial state. The loading unit driving motor 126 is rotated thereby to drive the loading unit 100 along the direction of arrow A. As shown in FIG. 6, the gear wheel 131a of the first driving gear 131 transfers onto the rack 146b of the first lock gear 146 from the first rack 9a of the upper rack plate 9. And, the gear wheel 131a is engaged with the gear wheel 146c through the corner teeth 146d. For this reason, the first lock gear 146 rotates along the direction of arrow a. Also, the second driving gear 133 coupled to the first driving gear 131 transfers onto the second lock gear 147 from the second rack 9b of the upper rack plate 9. At the same time, the third driving gear 135 transfers from the third rack 10a of the lower rack plate 10 onto the third lock gear 148. As a result, the second lock gear 147 and the third lock gear 148 rotate along the directions of arrows c and e, respectively, in such a manner of the first lock gear 146.

In this operation, the four stepped pins 101p formed on the left side of the mechanism base 101 are fitted in the guide holes 7a of the left side plate 7, so that the loading unit 100 is locked both vertically and longitudinally of the disk changer apparatus.

As shown in FIG. 19, by the rotation of the third lock gear 148 along the direction of arrow e, the forward end 148f of the third lock gear 148 drives the guide rib 149a of the lock shaft 149 along the direction of arrow N, so that the lock pin 149b is engaged with the guide rib 101o provided on the lower surface of the mechanism base 101. Consequently, the loading unit 100 is locked laterally of the disk changer apparatus. At the same time, the switch portion 149 of the lock shaft 149 presses the rest switch 150 to be into on state, thereby stopping the rotation of the loading unit driving motor 126.

In the locked state shown in FIG. 19, the third driving gear 135 is in mesh with the third lock gear 148, the lock shaft 149 is in mesh with the mechanism base 101, and the stepped pin 101p is mesh with the guide hole 7a. Further, under this condition, the first lock gear 146 located above the loading unit 100 is in mesh with the first driving gear 131, and the second lock gear 147 is in mesh with the second driving gear 133. The loading unit 100, therefore, is completely locked with the left side plate 7 at the left end portions of the upper rack plate 9 and the lower rack plate 10. As a result, even if a shock due to the fall or the like is imparted on the disk changer apparatus in transit, the loading unit 100 is prevented from moving and vibrating.

Figure 31:
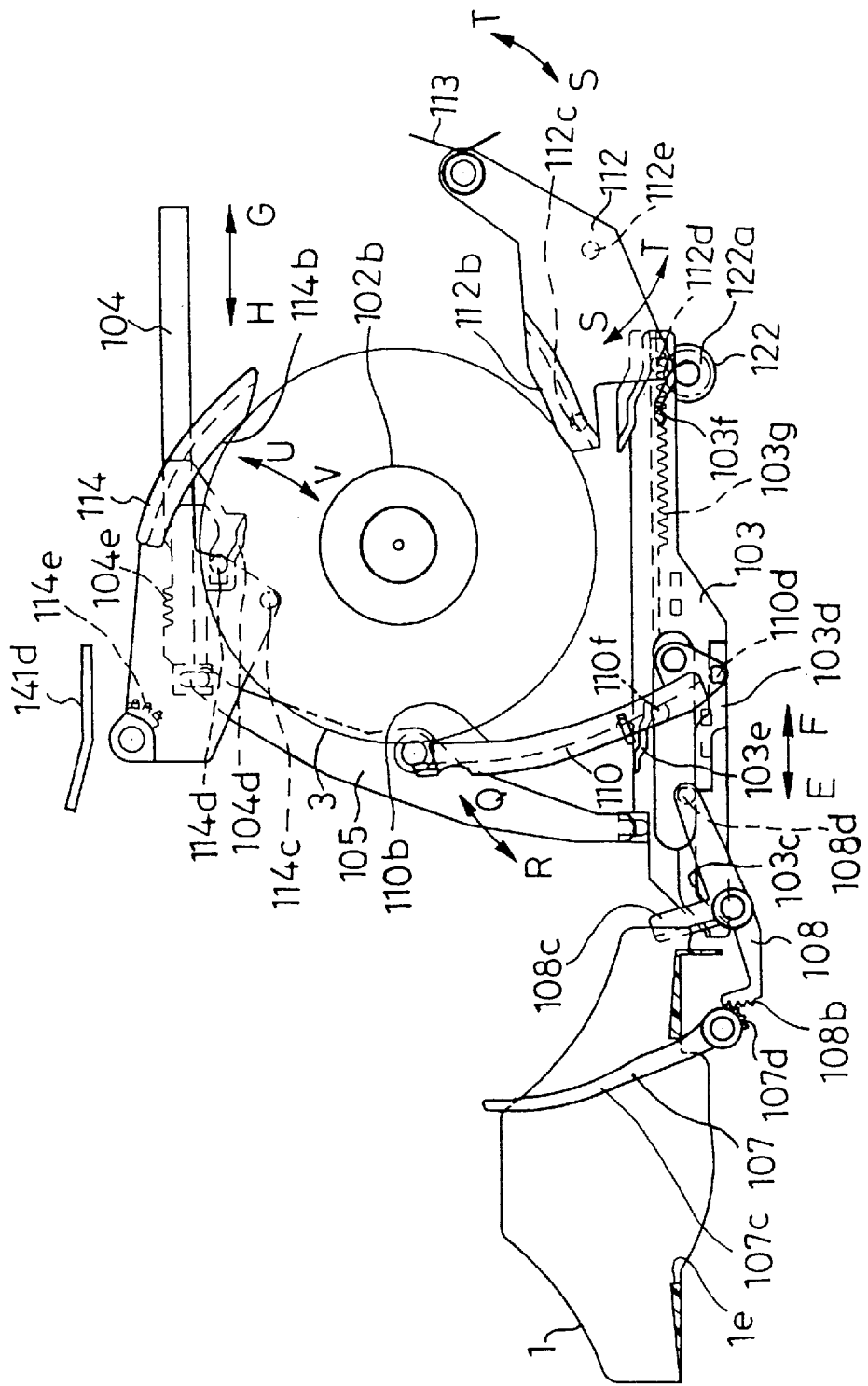
FIG. 31 is a side view showing the loading unit and the like of the disk changer apparatus of the embodiment after complete transportation of a small disk.

Also, during the playback of the disks 2, 3 in the playback mode shown in FIGS. 26 and 31, the lever 107c of the forward feed lever unit 107 is advanced into and held in vacant holding slots 1b of the stocker tray 1. During the playback operation of the disk 2, 3, therefore, other disks 2, 3 cannot be mounted in the vacant holding slots 1b of the stock tray 1. Even when the disks 2, 3 are mounted in the vacant holding slots 1b of the stocker tray 1 when opening the front door 5, the disks 2, 3 are prevented from being held in double in the same holding slots 1b. As a result, in the disk changer apparatus of this embodiment, the disks 2, 3 can be easily and safely mounted and replaced in the stocker tray 1 without interrupting the playback operation.

Also, as shown in FIG. 17, the loading unit 100 of this embodiment includes a light-emitting device 151 on the front thereof. When the loading unit 100 moves laterally of the disk changer apparatus, therefore, the light from the light-emitting device 151 brightens the end surface of the disks 2, 3 held in the stocker tray 1 or directly the transparent window 5b on the front door 5. The movement of the loading unit 100 can thus be confirmed appropriately.

Further, as shown in FIG. 17, the light-emitting device 144 is provided as the disk sensor on the sensor printed board 142. With the movement of the loading unit 100, the light from the light-emitting device 144 also moves in similar fashion. As a consequence, the movement of the loading unit 100 can be confirmed also by means of the light emitting device 144, either directly through the transparent window 5b of the front door 5 or by the movement of the light on the end surface of the loading unit 100.

It will thus be understood from the foregoing description of this embodiment, the loading unit 100 includes the forward feed lever unit 107 providing a first lift lever for retrieving the disks 2, 3 from under the stocker tray 1 and the rearward feed lever unit 110 providing a second lift lever for transferring the disks 2, 3 to the disk playback unit 102. As a result, the disks 2, 3 held in the stocker tray 1 can easily be supplied to or exchanged with the disks 2, 3 held in the stocker tray 1. Also, the mechanism for transporting the disks 2, 3 is arranged above the disks 2, 3 held in the stocker tray 1, and therefore a small disk changer apparatus constructed with a small number of component parts can be realized.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A disk changer apparatus comprising a stocker tray for holding a plurality of disks of different diameters in juxtaposition;

disk position search means for searching for a position of a designated disk among the disks held in said stocker tray;

transport means for driving disk playback means to the position of the designated disk in said stocker tray in a direction parallel to a direction of juxtaposition of the disks held in said stocker tray in response to a signal from said disk position search means, said disk playback means being adapted to support and play back the designated disk; and disk transfer means including a first lever located under said stocker tray for taking out the designated disk from said stocker tray by said first lever contacting a lower portion of the designated disk, and a second lever for guiding a lower portion of the designated disk, immediately following the operation of said first lever from under said stocker tray, and transferring the designated disk to said disk playback means.

2. A disk changer apparatus in accordance with claim 1, wherein said disk transport means includes a third lever for returning the disk from said disk playback means to the stocker tray.

3. A disk changer apparatus in accordance with claim 1, wherein the first lever of said disk transfer means is arranged in a vacant holding slot of said stocker tray from which said disk has been taken out and transferred to said disk playback means.

4. A disk changer apparatus in accordance with claim 1, wherein said disk position search means includes a pair of disk sensors arranged on opposing sides of and in a diametral direction of the disks held in said stocker tray for detecting the presence or absence of the disks in said stocker tray by moving said transport means.

5. A disk changer apparatus in accordance with claim 1, further comprising a screen belt suspended behind said stocker tray in such a manner as to prevent the movement of the disks other than the designated disk in said stocker tray and arranged in such a manner as to circumvent the rear part of the disk playback means supporting the designated disk.

6. A disk changer apparatus in accordance with claim 1, further comprising a frame unit which movably holds a loading unit with said disk playback means, wherein said frame unit has racks formed in parallel to the direction of the juxtaposed arrangement of the disks held in said stocker tray, said racks being adapted to engage gear wheels located on said loading unit, and lock gears being located on the frame unit at one end of the racks, such that said gear wheels engage the lock gears when the gear wheels reach the one end of said racks, said lock gears being rotatable to a fixed position on said frame unit after rotating a predetermined number of angular degrees.

7. A disk changer apparatus in accordance with claim 6, wherein the frame unit includes side plates and at least a guide hole is formed in one of the side plates of said frame unit in opposed relation with a side face of said loading unit in an initial state, said guide hole being adapted to receive a protrusion formed on said side face of said loading unit in said initial state.

8. A disk changer apparatus in accordance with claim 6, wherein said frame unit has a groove having a V-shaped cross section formed therein parallel to said racks, a roller having a V-shaped cross section adapted to slidably engage said groove is located on said loading unit, and said loading unit is driven in parallel to the direction of juxtaposition of the disks held in said stocker tray.

9. A disk changer apparatus in accordance with claim 1, further comprising an engaging unit adapted to contact an outer periphery of a disk, and a size detection lever which is located at a substantially opposite position to said engaging unit and adapted to contact the outer periphery of said disk, the size detection lever rotates in a direction in parallel to a transporting direction of the disk to identify disks of different diameters.

10. A disk changer apparatus in accordance with claim 1, further comprising a light-emitting device arranged on said disk transfer means for emitting light behind the disks held in said stocker tray, wherein movement of said disk transfer means and said light-emitting device is adapted to provide a visible indication through the disks and through gaps between the juxtaposed disks from a front of the disk changer apparatus as the transport means is moved.

11. A disk changer apparatus in accordance with claim 1, wherein a positioning member is inserted into a disk holding slot other than the designated disk in the stocker tray before the first lever of said disk transfer means advances into the designated disk holding slot of the stocker tray.

\* \* \* \* \*